(12) United States Patent
Fattal

(10) Patent No.: US 11,327,337 B2
(45) Date of Patent: May 10, 2022

(54) MODE-SWITCHABLE BACKLIGHT, DISPLAY, AND METHOD

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 16/894,234

(22) Filed: Jun. 5, 2020

(65) Prior Publication Data

US 2020/0301165 A1    Sep. 24, 2020

Related U.S. Application Data

(63) Continuation of application No. PCT/US2017/067122, filed on Dec. 18, 2017.

(51) Int. Cl.
*G02B 30/33* (2020.01)
*G02B 5/18* (2006.01)
(Continued)

(52) U.S. Cl.
CPC ........... *G02B 30/33* (2020.01); *G02B 5/1819* (2013.01); *G02B 5/1866* (2013.01); *G02B 6/005* (2013.01); *G02B 27/425* (2013.01)

(58) Field of Classification Search
CPC .... G02B 27/42; G02B 27/425; G02B 5/1819; G02B 5/1866; G02B 6/0028;
(Continued)

(56) References Cited

U.S. PATENT DOCUMENTS

| 5,561,558 A | 10/1996 | Shiono et al. |
| 8,035,762 B2 | 10/2011 | Ijzerman et al. |

(Continued)

FOREIGN PATENT DOCUMENTS

| KR | 101680770 B1 | 11/2016 |
| WO | 2012038856 A1 | 3/2012 |

(Continued)

OTHER PUBLICATIONS

International Search Report and Written Opinion (ISRWO) from the International Searching Authority (ISA/KR) dated Sep. 11, 2018 (15 pages) for counterpart parent PCT Application No. PCT/US2017/067122.

(Continued)

*Primary Examiner* — Zheng Song
(74) *Attorney, Agent, or Firm* — J. Michael Johnson

(57) ABSTRACT

A mode-switchable backlight and mode-switchable display employ a first planar backlight to emit broad-angle emitted light during a first mode and a second planar backlight to emit directional emitted light during a second mode. The second planar backlight includes a plate light guide and an array of multibeam elements configured to scatter out guided light from the light guide during a second mode as the directional emitted light including a plurality of directional light beams having principal angular directions corresponding to view directions of a multiview image. The mode-switchable display further includes a light valve array configured to modulate the broad-angle emitted light to provide a two-dimensional image during the first mode and to modulate the directional emitted light to provide a multiview image during the second mode.

22 Claims, 10 Drawing Sheets

(51) Int. Cl.
  *F21V 8/00* (2006.01)
  *G02B 27/42* (2006.01)
(58) Field of Classification Search
  CPC .... G02B 6/0031; G02B 6/0036; G02B 6/005;
               G02B 6/0053; G02B 6/0055
  See application file for complete search history.

(56) References Cited

U.S. PATENT DOCUMENTS

| | | | |
|---|---|---|---|
| 8,810,750 B2 | 8/2014 | Mun et al. | |
| 8,821,001 B2* | 9/2014 | Minami | G02F 1/1336 362/613 |
| 8,903,207 B1 | 12/2014 | Brown et al. | |
| 9,128,226 B2 | 9/2015 | Fattal et al. | |
| 9,201,270 B2 | 12/2015 | Fattal et al. | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,785,119 B2 | 10/2017 | Taff et al. | |
| 10,120,200 B2* | 11/2018 | Yang | G02B 6/0088 |
| 10,649,128 B2 | 5/2020 | Fattal et al. | |
| 2002/0141056 A1* | 10/2002 | Kobayashi | G02B 30/00 359/462 |
| 2006/0262564 A1 | 11/2006 | Baba | |
| 2010/0177025 A1 | 7/2010 | Nagata et al. | |
| 2010/0277803 A1 | 11/2010 | Pockett et al. | |
| 2011/0188106 A1 | 8/2011 | Bae et al. | |
| 2011/0216266 A1 | 9/2011 | Travis | |
| 2011/0242441 A1 | 10/2011 | Minami | |
| 2011/0317261 A1* | 12/2011 | Minami | H04N 13/315 359/462 |
| 2012/0075698 A1* | 3/2012 | Minami | G02B 6/0043 359/462 |
| 2012/0113678 A1* | 5/2012 | Cornelissen | G02B 6/0063 362/607 |
| 2012/0127751 A1* | 5/2012 | Kimmel | G02B 6/0036 362/602 |
| 2012/0147059 A1 | 6/2012 | Chen et al. | |
| 2012/0195072 A1 | 8/2012 | Minami | |
| 2012/0256974 A1* | 10/2012 | Minami | G02B 6/0058 345/690 |
| 2012/0257406 A1* | 10/2012 | Minami | H04N 13/312 362/602 |
| 2012/0275183 A1* | 11/2012 | Minami | H04N 13/312 362/602 |
| 2012/0306861 A1* | 12/2012 | Minami | G02B 30/27 345/419 |
| 2013/0076999 A1* | 3/2013 | Minami | G02B 6/0036 349/15 |
| 2013/0083260 A1* | 4/2013 | Minami | G02B 30/00 349/15 |
| 2013/0308339 A1 | 11/2013 | Woodgate et al. | |
| 2013/0343038 A1 | 12/2013 | Niu et al. | |
| 2014/0140094 A1 | 5/2014 | Miyao | |
| 2014/0146271 A1 | 5/2014 | Hung | |
| 2014/0160562 A1* | 6/2014 | Minami | G02B 6/0068 359/462 |
| 2015/0022746 A1 | 1/2015 | Ichihashi et al. | |
| 2015/0355403 A1 | 12/2015 | Santori | |
| 2017/0031170 A1* | 2/2017 | Yang | H04N 13/312 |
| 2017/0108636 A1* | 4/2017 | Yoon | G02B 6/0038 |
| 2017/0153383 A1* | 6/2017 | Lee | G02B 6/0076 |
| 2017/0329149 A1 | 11/2017 | Fattal | |
| 2017/0363794 A1 | 12/2017 | Wan et al. | |
| 2018/0024289 A1 | 1/2018 | Fattal | |
| 2018/0059308 A1* | 3/2018 | Li | G02B 6/0068 |
| 2018/0196194 A1 | 7/2018 | Fattal | |
| 2018/0299608 A1 | 10/2018 | Fattal et al. | |
| 2018/0306965 A1 | 10/2018 | Fattal | |
| 2019/0155105 A1 | 5/2019 | Aieta et al. | |
| 2020/0117053 A1 | 4/2020 | Fattal et al. | |

FOREIGN PATENT DOCUMENTS

| | | |
|---|---|---|
| WO | 2014142851 A1 | 9/2014 |
| WO | 2016160048 A1 | 10/2016 |
| WO | 2017041073 A1 | 3/2017 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

* cited by examiner

MODE-SWITCHABLE BACKLIGHT, DISPLAY, AND METHOD

CROSS-REFERENCE TO RELATED APPLICATIONS

This application is a continuation application of and claims the benefit of priority to prior International Application No. PCT/US2017/067122, filed Dec. 18, 2017, the entire contents of which is incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light-emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. Backlights are light sources (often panel light sources) that are placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
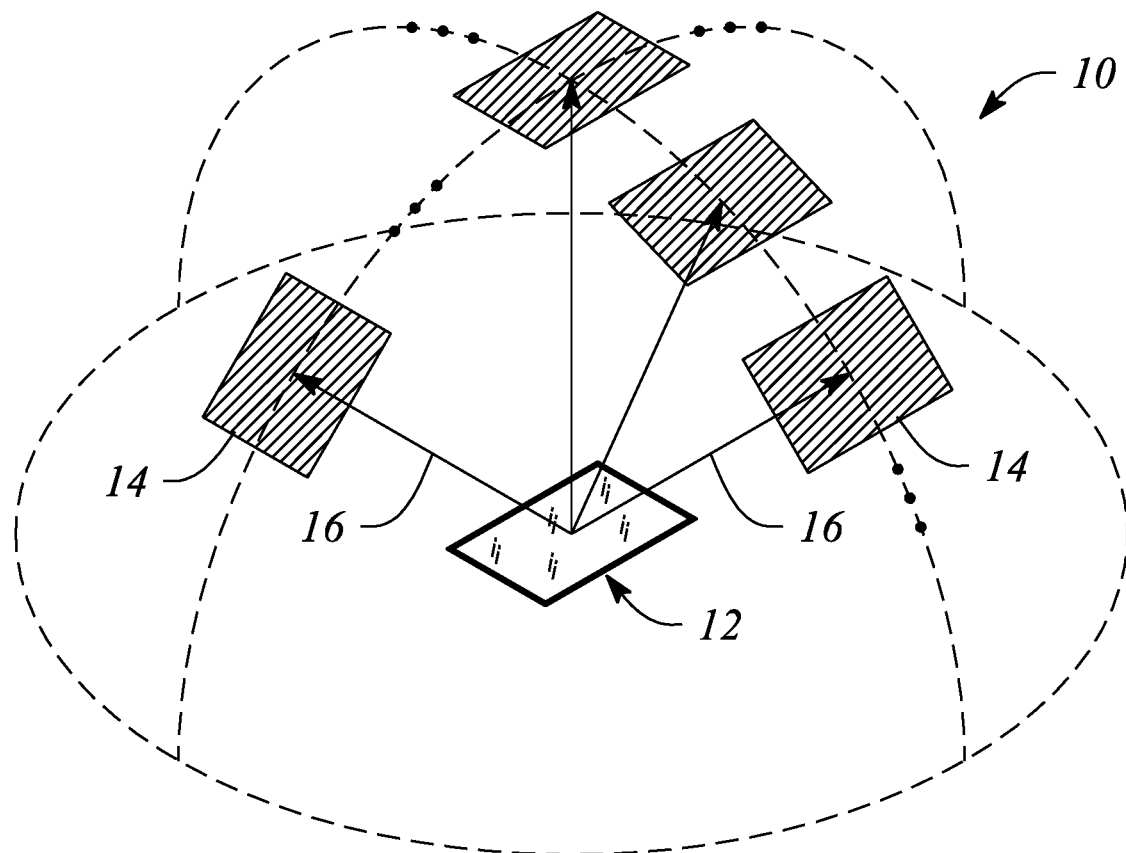
FIG. 1A illustrates a perspective view of a multiview display in an example, according to an embodiment consistent with the principles described herein.

Certain examples and embodiments may have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide mode-switchable backlighting with application to a mode-switchable display. In particular, in accordance with the principles described herein, information may be selectively displayed using the mode-switchable display in a first mode configured to support the display of two-dimensional (2D) information (e.g., a 2D image) and in a second mode configured to support the display of multiview or three-dimensional (3D) information (e.g., a multiview image). The second mode may be employed to present images and similar information in conjunction with a so-called 'glasses-free' or autostereoscopic display system, while the first mode may be used to present information that either lacks or at least does not benefit from a third dimension (e.g., information such as text, 2D images, etc.), according to various embodiments. Moreover, the switchable modes are provided on the same display unit or system, according to various embodiments of the principles described herein. A switchable display system that is capable of selectively displaying both 2D information and multiview or 3D information on the same display system may facilitate adapting a single display system to a much wider range of differing data presentation requirements than is possible using either a 2D display alone or a multiview display alone.

According to various embodiments, a mode-switchable backlight is employed to facilitate switching between modes. In particular, a first layer of the mode-switchable backlight provides broad-angle or diffuse emitted light configured to provide or display 2D information. A second layer of the mode-switchable backlight is configured to support the display of multiview or 3D information by emitting a directional emitted light comprising a plurality of directional light beams having predetermined principal angular directions corresponding to various view directions of a multiview image. According to various embodiments, the first layer of the mode-switchable backlight may include substantially any planar backlight. The second layer of the mode-switchable backlight includes a light guide and a multibeam element to produce scattered-out directional light beams of the directional emitted light, according to various embodiments. Uses of mode-switchable or mode-switchable backlighting and mode-switchable displays described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

Herein a 'two-dimensional display' or '2D display' is defined as a display configured to provide a view of an image that is substantially the same regardless of a direction from which the image is viewed (i.e., within a predefined viewing angle or range of the 2D display). A liquid crystal display (LCD) found in may smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image.

In some instances, a multiview display may also be referred to as a three-dimensional (3D) display, e.g., when simultaneously viewing two different views of the multiview image provides a perception of viewing a three dimensional image.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
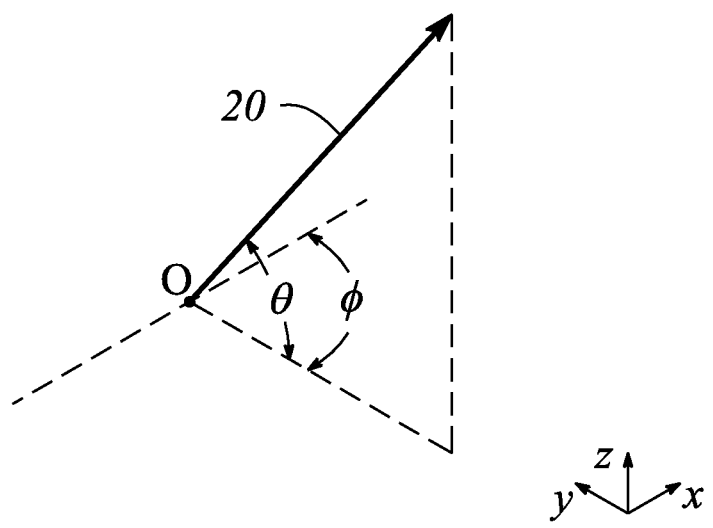
FIG. 1B illustrates a graphical representation of the angular components of a light beam having a particular principal angular direction in an example, according to an embodiment consistent with the principles described herein.

FIG. 1B illustrates a graphical representation of the angular components $\{\theta, \phi\}$ of a light beam 20 having a particular principal angular direction or simply 'direction' corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of sub-pixels or 'view' pixels in each of a similar plurality of different views of a multiview display. In particular, a multiview pixel may have an individual view pixels corresponding to or representing a view pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels of a multiview pixel may have equivalent or at least substantially similar locations or coordinates in each of the different views. For example, a first multiview pixel may have individual view pixels located at $\{x_1, y_1\}$ in each of the different views of a multiview image, while a second multiview pixel may have individual view pixels located at $\{x_2, y_2\}$ in each of the different views, and so on.

In some embodiments, a number of view pixels in a multiview pixel may be equal to a number of views of the multiview display. For example, the multiview pixel may provide sixty-four (64) view pixels in associated with a multiview display having 64 different views. In another example, the multiview display may provide an eight by four array of views (i.e., 32 views) and the multiview pixel may include thirty-two (32) view pixels (i.e., one for each view). Additionally, each different view pixel may have an associated direction (e.g., light beam direction) that corresponds to a different one of the view directions corresponding to the 64 different views, for example. Further, according to some embodiments, a number of multiview pixels of the multiview display may be substantially equal to a number of pixels (i.e., pixels that make up a selected view) in the multiview display views. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

Herein, a 'light guide' is defined as a structure that guides light within the structure using total internal reflection or 'TIR'. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, an 'angle-preserving scattering feature' or equivalently an 'angle-preserving scatterer' is any feature or scatterer configured to scatter light in a manner that substantially preserves in scattered light an angular spread of light incident on the feature or scatterer. In particular, by definition, an angular spread $\sigma_s$ of light scattered by an angle-preserving scattering feature is a function of an angular spread $\sigma$ of the incident light (i.e., $\sigma_s = f(\sigma)$). In some embodiments, the angular spread $\sigma_s$ of the scattered light is a linear function of the angular spread or collimation factor $\sigma$ of the incident light (e.g., $\sigma_s = \alpha \cdot \sigma$, where $\alpha$ is an integer). That is, the angular spread $\sigma_s$ of light scattered by an angle-preserving scattering feature may be substantially proportional to the angular spread or collimation factor $\sigma$ of the incident light. For example, the angular spread $\sigma_s$ of the scattered light may be substantially equal to the incident light angular spread $\sigma$ (e.g., $\sigma_s \approx \sigma$). A uniform diffraction grating (i.e., a diffraction grating having a substantially uniform or constant diffractive feature spacing or grating pitch) is an example of an angle-preserving scattering feature. In contrast, a Lambertian scatterer or a Lambertian reflector as well as a general diffuser (e.g., having or approximating Lambertian scattering) are not angle-preserving scatterers, by definition herein.

Herein, a 'polarization-preserving scattering feature' or equivalently a 'polarization-preserving scatterer' is any feature or scatterer configured to scatter light in a manner that substantially preserves in scattered light a polarization or at least a degree of polarization of the light incident on the feature or scatterer. Accordingly, a 'polarization-preserving scattering feature' is any feature or scatterer where a degree of polarization of a light incident on the feature or scatterer is substantially equal to the degree of polarization of the scattered light. Further, by definition, 'polarization-preserving scattering' is scattering (e.g., of guided light) that preserves or substantially preserves a predetermined polarization of the light being scattered. The light being scattered may be polarized light provided by a polarized light source, for example.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross-sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
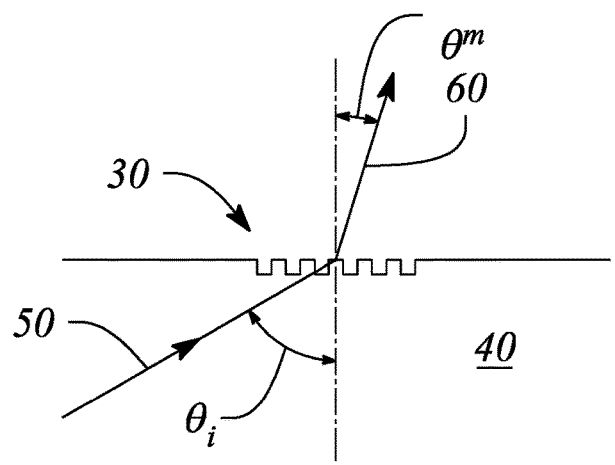
FIG. 2 illustrates a cross-sectional view of a diffraction grating in an example, according to an embodiment consistent with the principles described herein.

FIG. 2 illustrates a cross-sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The incident light beam 50 may be a beam of guided light (i.e., a guided light beam) within the light guide 40. Also illustrated in FIG. 2 is a directional light beam 60 diffractively produced and coupled-out by the diffraction grating 30 as a result of diffraction of the incident light beam 50. The directional light beam 60 has a diffraction angle $\theta_m$ (or 'principal angular direction' herein) as given by equation (1). The diffraction angle $\theta_m$ may correspond to a diffraction order 'm' of the diffraction grating 30, for example diffraction order m=1 (i.e., a first diffraction order).

By definition herein, a 'multibeam element' is a structure or element of a backlight or a display that produces light that includes a plurality of light beams. In some embodiments, the multibeam element may be optically coupled to a light guide of a backlight to provide the plurality of light beams by coupling or scattering out a portion of light guided in the light guide. Further, the light beams of the plurality of light beams produced by a multibeam element have different principal angular directions from one another, by definition herein. In particular, by definition, a light beam of the plurality has a predetermined principal angular direction that is different from another light beam of the light beam plurality. As such, the light beam is referred to as a 'directional light beam' and the light beam plurality may be termed a 'directional light beam plurality, by definition herein.

Furthermore, the directional light beam plurality may represent a light field. For example, the directional light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

According to various embodiments, the different principal angular directions of the various directional light beams of the plurality are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a directional light beam produced by the multibeam element has a principal angular direction given by angular components $\{\theta, \phi\}$, by definition herein, and as described above with respect to FIG. 1B.

Herein a 'collimator' is defined as substantially any optical device or apparatus that is configured to collimate light. For example, a collimator may include, but is not limited to, a collimating mirror or reflector, a collimating lens, a diffraction grating, a tapered light guide, and various combinations thereof. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape or similar collimating characteristic in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor σ may specify that a majority of light rays in a beam of collimated light is within a particular angular spread (e.g., +/− σ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example. A 'polarized' light source is defined herein as substantially any light source that produces or provides light having a predetermined polarization. For example, the polarized light source may comprise a polarizer at an output of an optical emitter of the light source.

Further, as used herein, the article 'a' is intended to have its ordinary meaning in the patent arts, namely 'one or more'. For example, 'a multibeam element' means one or more multibeam elements and as such, 'the multibeam element' means 'the multibeam element(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
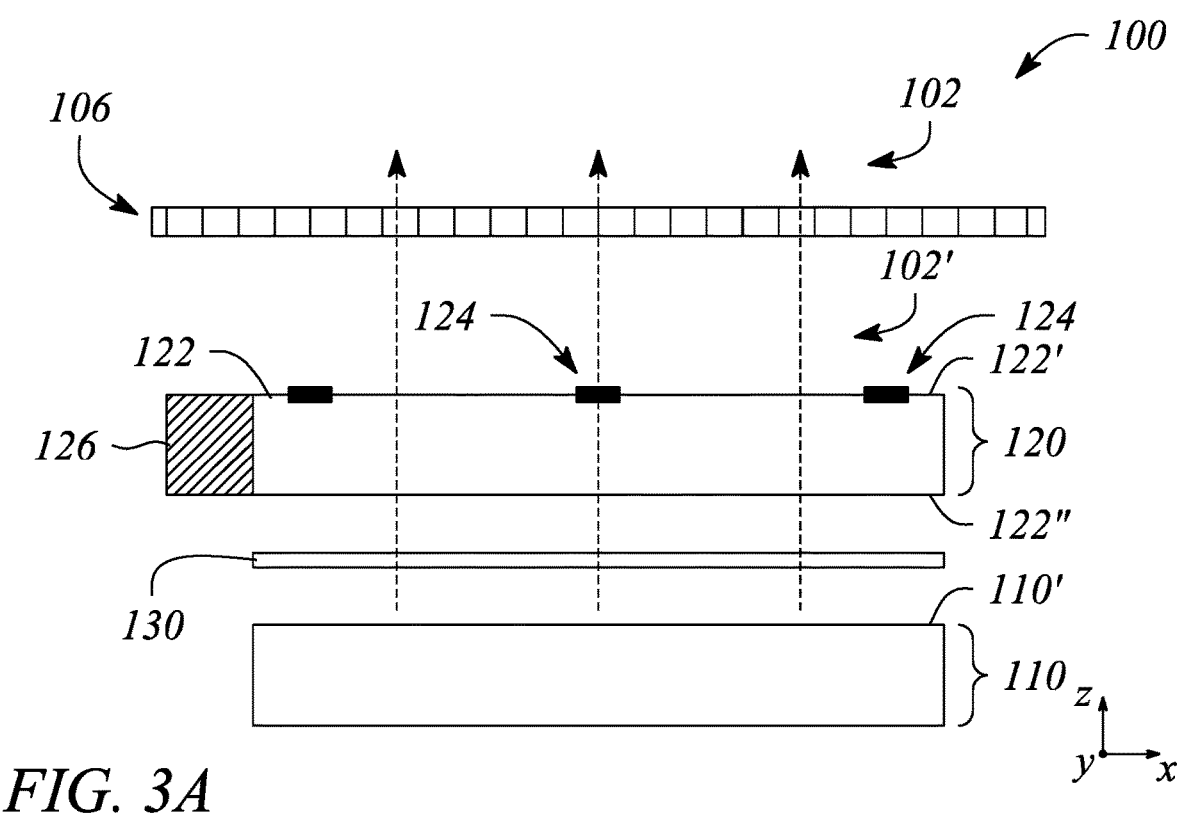
FIG. 3A illustrates a cross-sectional view of the mode-switchable backlight in an example, according to an embodiment consistent with the principles described herein.
Figure 3B:
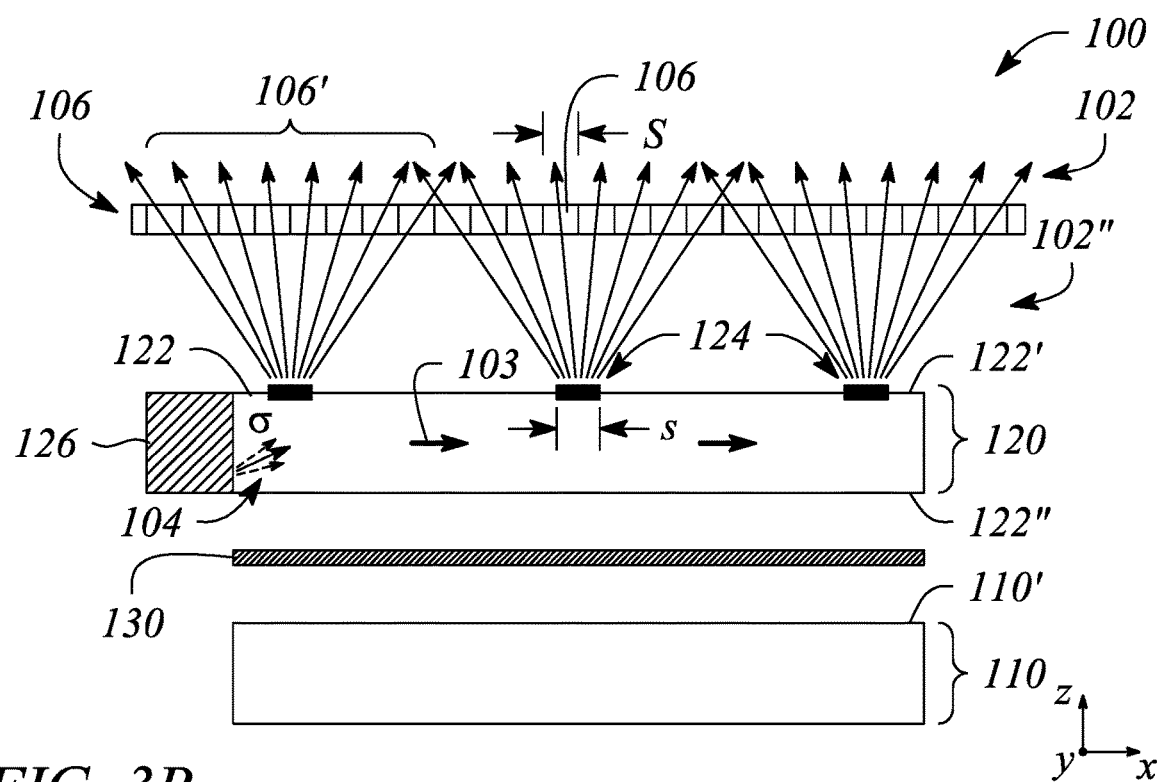
FIG. 3B illustrates a cross-sectional view of a mode-switchable backlight in another example, according to an embodiment consistent with the principles described herein.
Figure 3C:
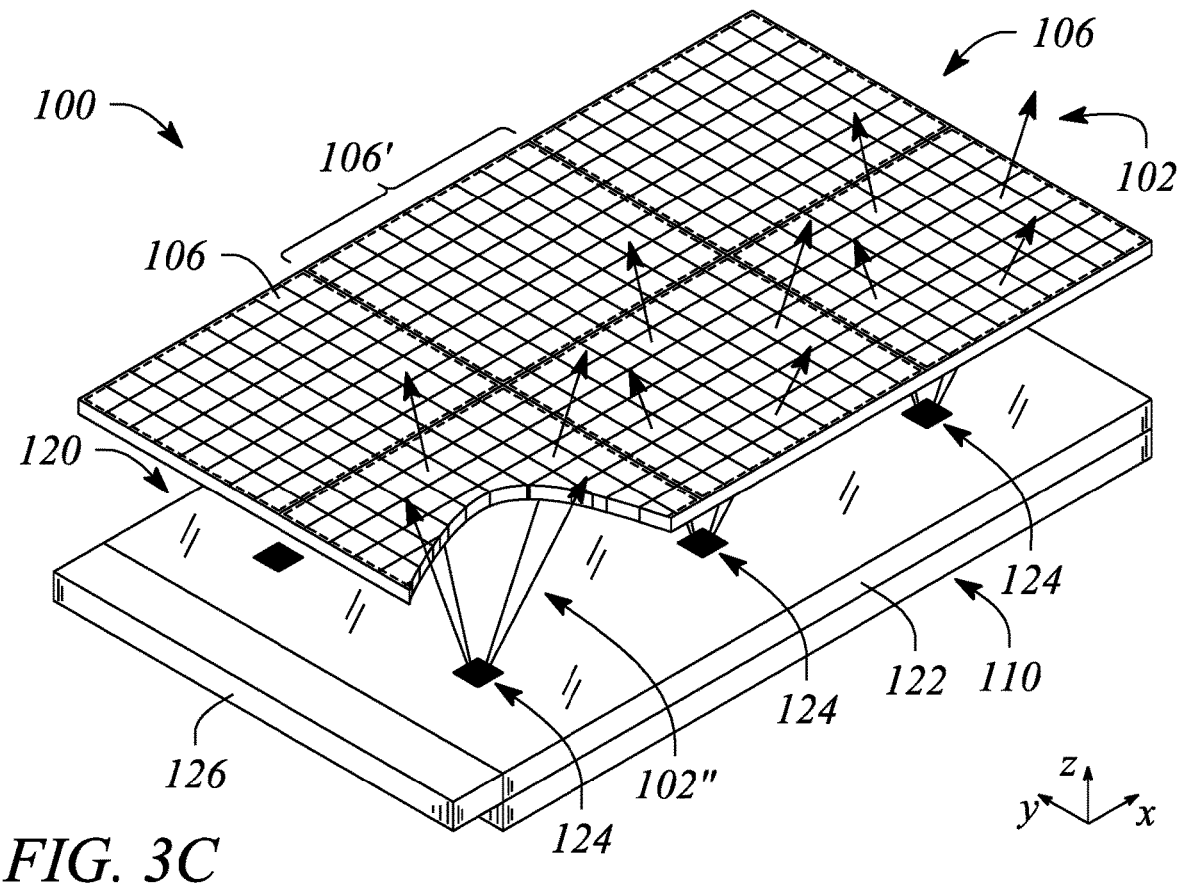
FIG. 3C illustrates a perspective view of a mode-switchable backlight in an example, according to an embodiment consistent with the principles described herein.

In accordance with some embodiments of the principles described herein, a mode-switchable backlight is provided. FIG. 3A illustrates a cross-sectional view of the mode-switchable backlight 100 in an example, according to an embodiment consistent with the principles described herein. FIG. 3B illustrates a cross-sectional view of a mode-switchable backlight 100 in another example, according to an embodiment consistent with the principles described herein. In particular, FIG. 3A illustrates the mode-switchable backlight 100 configured to operate in a first mode, while FIG. 3B illustrates the mode-switchable backlight 100 configured to operate in a second mode. FIG. 3C illustrates a perspective view of a mode-switchable backlight 100 in an example, according to an embodiment consistent with the principles described herein. The mode-switchable backlight 100 illustrated in FIG. 3C is configured to operate in the second mode, by way of example and not limitation.

According to various embodiments, the mode-switchable backlight 100 is configured to provide or emit light as emitted light 102. In particular, the mode-switchable backlight 100 is configured to provide emitted light 102 in a direction that is generally away from the mode-switchable backlight 100 (e.g., away from a surface thereof), as illustrated by various arrows in FIGS. 3A-3C. The emitted light 102 may be used to illuminate an electronic display that employs the mode-switchable backlight 100, according to various examples and embodiments. For example, the emitted light 102 may be used to illuminate an array of light valves (e.g., light valves 106, described below) in a display application. Further, in some embodiments, the electronic display that employs the mode-switchable backlight 100 may be configured to selectively display one or both of a two-dimensional (2D) image and a three-dimensional (3D) or multiview image using the emitted light 102, e.g., when used in a mode-switchable display.

In particular, according to various operational modes of the mode-switchable backlight 100, the emitted light 102 may have or exhibit different characteristics. In particular, light emitted by the mode-switchable backlight 100 as the emitted light 102 may comprise light that is either directional and diffuse or substantially non-directional. Moreover, the different characteristics are selectable according to an operational mode (e.g., the first mode or the second mode) of the mode-switchable backlight 100. For example, as described below in more detail, in the first mode, mode-switchable backlight 100 may provide the emitted light 102 as broad-angle emitted light 102'. Alternatively, in the second mode, the mode-switchable backlight 100 is configured to provide the emitted light 102 as directional emitted light 102", for example. According to various embodiments, the directional emitted light 102" provided during the second mode comprises a plurality of directional light beams having principal angular directions that differ from one another.

By definition, 'broad-angle' emitted light 102' is defined as light having a cone angle that is greater than a cone angle of the view of a multiview image or multiview display associated with the mode-switchable backlight 100. In particular, in some embodiments, the broad-angle emitted light 102' may have a cone angle that is greater than about twenty degrees (e.g., >± 20°). In other embodiments, the broad-angle emitted light 102' cone angle may be greater than about thirty degrees (e.g., >± 30°, or greater than about forty degrees (e.g., >± 40°), or greater than about fifty degrees (e.g., >± 50°). For example, the cone angle of the broad-angle emitted light 102' may be greater than about sixty degrees (e.g., >± 60°).

In some embodiments, the broad-angle emitted light 102' cone angle may defined to be about the same as a viewing angle of an LCD computer monitor, an LCD tablet, an LCD television, or a similar digital display device meant for broad-angle viewing (e.g., about ± 40-65°. In other embodiments, broad-angle emitted light 102' provided by the mode-switchable backlight 100 may also be characterized or described as diffuse light, substantially diffuse light, non-directional light (i.e., lacking any specific or defined directionality), or as light having a single or substantially uniform direction. The broad-angle emitted light 102' is illustrated in FIG. 3A as a dashed arrows for ease of illustration. However, the dashed arrows representing the broad-angle emitted light 102' are not meant to imply any particular directionality of the emitted light 102, but instead merely represent the emission and transmission of light, e.g., from the mode-switchable backlight 100.

As mentioned above, the directional emitted light 102" provided by mode-switchable backlight 100 during the second mode comprises a plurality of directional light beams having different principal angular directions (or simply 'different directions') from one another. For example, the plurality of directional light beams may be or represent a light field. FIGS. 3B and 3C illustrate the plurality of directional light beams of the directional emitted light 102" as a plurality of diverging arrows. According to some embodiments, light beams of the different principal angular directions of directional light beams of the directional emitted light 102" may correspond to respective view directions of a multiview image or a multiview display, in or during the second mode.

In some of these embodiments, the directional light beams of the emitted light 102 may be modulated (e.g., using light valves 106, as described below) to facilitate the display of information having multiview or 3D image content, for example. In other embodiments, the different principal angular directions of the directional light beams in the second mode may correspond to a direction toward a relatively limited region of space adjacent to or in front of the mode-switchable backlight 100, e.g., a viewbox (not illustrated). In these embodiments, the directional light beams of the directional emitted light 102" may be modulated (e.g., by the light valves) to provide image content in the viewbox, for example.

As illustrated, the mode-switchable backlight 100 comprises a first planar backlight 110. The first planar backlight 110 has a planar light-emitting surface 110' configured to provide the broad-angle emitted light 102' during the first mode (e.g., see FIG. 3A). According to various embodiments, the first planar backlight 110 may be substantially any backlight having a substantially planar light-emitting surface 110'. For example, the first planar backlight 110 may be a direct-emitting or directly illuminated planar backlight. Direct-emitting or directly illuminated planar backlights include, but are not limited to, a backlight panel employing a planar array of cold-cathode fluorescent lamps (CCFLs), neon lamps or light emitting diodes (LEDs) configured to directly illuminate the planar light-emitting surface 110' and provide the broad-angle emitted light 102'. An electroluminescent panel (ELP) is another non-limiting example of a direct-emitting planar backlight.

In other examples, the first planar backlight 110 may comprise a backlight that employs an indirect light source. Such indirectly illuminated backlights may include, but are not limited to, various forms of edge-coupled or so-called 'edge-lit' backlights. An edge-lit backlight typically includes a light source (not illustrated in FIGS. 3A-3C) coupled to an edge or side of a light guide or similar guiding structure (e.g., a hollow guiding cavity or a light guide). The edge-coupled light source is configured to illuminate the guiding structure to provide light within the edge-lit backlight. The edge-coupled light source may include, but is not limited to, a CCFL and an LED, for example. The guiding structure may be configured to guide light from the edge-coupled light source using total internal reflection (TIR), a mirrored surface (e.g., a mirrored back surface), or a combination thereof, according to various examples. Further, in some examples, the guiding structure of the edge-lit backlight employed in the first planar backlight 110 may have a substantially rectangular cross section with parallel opposing surfaces (e.g., top and bottom surfaces). As such, the first planar backlight 110 may comprise a 'rectangular-shaped' guiding structure. In other examples, the guiding structure may have a tapered or wedge-shaped cross section (i.e., the guiding structure may be 'wedge-shaped') with a first surface that is substantially non-parallel with a second, opposing surface.

According to various embodiments, the edge-lit backlight employed as the first planar backlight 110 further includes an extraction feature (not illustrated in FIGS. 3A-3C). The extraction feature is configured to extract light from the guiding structure and redirect the extracted light in a direction away from the guiding structure. For example, the extraction feature of the edge-lit backlight may extract light as the broad-angle emitted light 102' and direct the broad-angle emitted light 102' away from the planar light-emitting surface 110'. Extraction features may include, but are not limited to, various spherical scattering structures (spherical scatterers), micro-prismatic films or layers, and the like adjacent to a surface (e.g., a top surface) of the guiding structure as well as various scatters or reflectors located either within the guiding structure itself or adjacent to one or both of a pair of opposing surfaces thereof.

Figure 4:
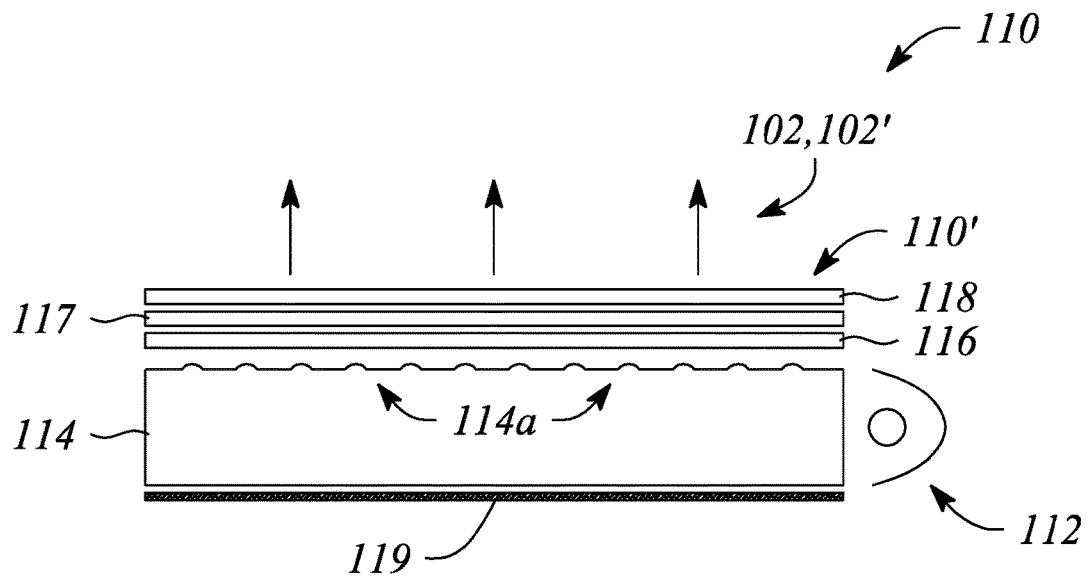
FIG. 4 illustrates a cross-sectional view of a first planar backlight in an example, according to an embodiment consistent with the principles described herein.

FIG. 4 illustrates a cross-sectional view of a first planar backlight 110 in an example, according to an embodiment consistent with the principles described herein. As illustrated in FIG. 4, the first planar backlight 110 comprises a light source 112 coupled to an edge of the first planar backlight 110. The edge-coupled light source 112 is configured to produce light within the first planar backlight 110. Further, as illustrated by way of example and not limitation, the first planar backlight 110 comprises a guiding structure 114 (or light guide) having a substantially rectangular cross section with parallel opposing surfaces (i.e., a rectangular-shaped guiding structure) along with a plurality of extraction features 114a. As illustrated, the scattering features 114a comprise spherical scatterers located at a surface of the guiding structure 114 adjacent to the planar light-emitting surface 110' (i.e., top surface) of the first planar backlight 110. Light from the edge-coupled light source 112 and guided within the rectangular-shaped guiding structure 114 may be redirected, scattered out of or otherwise extracted from the guiding structure 114 by the extraction features 114a to provide the broad-angle emitted light 102', according to various embodiments.

In some embodiments, the first planar backlight 110, whether direct-emitting or edge-lit (e.g., as illustrated in FIG. 4), may further comprise one or more additional layers or films including, but not limited to, a diffuser or diffusion layer, a brightness enhancement film (BEF), and a polarization recycling film or layer. For example, a diffuser may be configured to increase an emission angle of the broad-angle emitted light 102' when compared to that provided by the extraction features 114a alone. The brightness enhancement film may be used to increase an overall brightness of the broad-angle emitted light 102', in some examples. Brightness enhancement films (BEF) are available, for example, from 3M Optical Systems Division, St. Paul, Minn. as a Vikuiti™ BEF II which are micro-replicated enhancement films that utilize a prismatic structure to provide up to a 60% brightness gain. The polarization recycling layer may be configured to selectively pass a first polarization while reflecting a second polarization back toward the rectangular-shaped guiding structure 114. The polarization recycling layer may comprise a reflective polarizer film or dual brightness enhancement film (DBEF), for example. Examples of DBEF films include, but are not limited to, 3M Vikuiti™ Dual Brightness Enhancement Film available from 3M Optical Systems Division, St. Paul, Minn. In another example, an advanced polarization conversion film (APCF) or a combination of brightness enhancement and APCF films may be employed as the polarization recycling layer.

FIG. 4 illustrates the first planar backlight 110 further comprising a diffuser 116 adjacent to guiding structure 114 and the planar light-emitting surface 110' of the first planar backlight 110. Further, illustrated in FIG. 4 are a brightness enhancement film 117 and a polarization recycling layer 118, both of which are also adjacent to the planar light-emitting surface 110'. In some embodiments, the first planar backlight 110 further comprises a reflective layer 119 adjacent to a surface of the guiding structure 114 opposite to the planar light-emitting surface 110' (i.e., on a back surface), e.g., as illustrated in FIG. 4. The reflective layer 119 may comprise any of a variety of reflective films including, but not limited to, a layer of reflective metal or an enhanced specular reflector (ESR) film. Examples of ESR films include, but are not limited to, a Vikuiti™ Enhanced Specular Reflector Film available from 3M Optical Systems Division, St. Paul, Minn.

Referring again to FIGS. 3A-3C, the mode-switchable backlight 100 further comprises a second planar backlight 120. According to various embodiments, the second planar backlight 120 comprises a light guide 122 and an array of multibeam elements 124. Multibeam elements 124 of the multibeam element array are spaced apart from one another across the light guide 122. According to various embodiments, the array of multibeam elements 124 is configured to scatter out guided light 104 from the light guide 122 during the second mode as the directional emitted light 102" comprising the plurality of directional light beams having principal angular directions. Further, directional light beams of the directional light beam plurality have different principal angular directions from one another and the different principal angular directions correspond to view directions of a multiview image, according to various embodiments.

In particular, a multibeam element 124 of the multibeam element array may be configured to scatter out a portion of the guided light 104 from within the light guide 122 and to direct the scattered out portion away from a first surface 122' of the light guide 122 or equivalent from a first surface of the second planar backlight 120, as illustrated in FIG. 3B. For example, the guided light portion may be scattered out by the multibeam element 124 through the first surface 122'. Further, as illustrated in FIGS. 3A-3C, a second surface of the second planar backlight 120 opposite to the first surface is adjacent to the planar light-emitting surface 110' of the first planar backlight 110, according to various embodiments.

Note that the plurality of directional light beams of the directional emitted light 102", as illustrated in FIG. 3B, is or represents the plurality of directional light beams having different principal angular directions, described above. That is, a directional light beam has a different principal angular direction from other directional light beams of the directional emitted light 102", according to various embodiments. Further, the second planar backlight 120 may be substantially transparent (e.g., in at least the first mode) to allow the broad-angle emitted light 102' from the first planar backlight 110 to pass or be transmitted through a thickness of the second planar backlight 120, as illustrated in FIG. 3A by the dashed arrows that originate at the first planar backlight 110 and subsequently pass through the second planar backlight 120. In other words, the broad-angle emitted light 102' provided by the first planar backlight 110 is configured to be transmitted through the second planar backlight 120 during the first mode, e.g., by virtue of the second planar backlight transparency.

In particular, the light guide 122 and the spaced apart plurality of multibeam elements 124 allow light to pass through the light guide 122 through both the first surface 122' and the second surface 122". Transparency may be facilitated, at least in part, due to both the relatively small size of the multibeam elements 124 and the relative large inter-element spacing of the multibeam element 124. Further, especially when the multibeam elements 124 comprise diffraction gratings as described below, the multibeam elements 124 may also be substantially transparent to light propagating orthogonal to the light guide surfaces 122', 122", in some embodiments. Thus, for example, light from the first planar backlight 110 may pass in the orthogonal direction through the light guide 122 with the multibeam element array of the second planar backlight 120, according to various embodiments.

As described above, the mode-switchable backlight 100 has a pair of switchable modes, i.e., the first and second modes. In the first mode, the first planar backlight 110 is configured to provide the broad-angle emitted light 102' that is, in turn, transmitted through the second planar backlight 120. In a second mode, the second planar backlight 120 is configured to provide the plurality of directional light beams of the directional emitted light 102". FIG. 3A represents the first mode of the mode-switchable backlight 100 with the broad-angle emitted light 102' provided by the first planar backlight 110, while FIG. 3B represents the second mode of the mode-switchable backlight 100 in which the directional emitted light 102" (e.g., as directional light beams) is provided by the second planar backlight 120. In some embodiments, the first and second modes may be mutually exclusive in or with respect to time. That is, the mode-switchable backlight 100 may be operated in either the first mode or the second mode at any particular point in time. In other embodiments, a portion of the mode-switchable backlight 100 may be operated in the first mode while another portion of the mode-switchable backlight 100 may be operated in the second mode.

As mentioned above and according to various embodiments, second planar backlight 120 comprises the light guide 122. The light guide 122 may be a plate light guide, in some embodiments. The light guide 122 is configured to guide light (e.g., from a light source described below) as the guided light 104. In particular, the guided light 104 is guided in a first propagation direction 103, e.g., to the right as illustrated by a bold arrow in FIG. 3B. The light guide 122 is configured to guide light along a length of the light guide 122 as guided light 104. For example, the light guide 122 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 122, for example.

In some embodiments, the light guide 122 may be a slab or plate optical waveguide comprising an extended, substantially planar sheet of optically transparent, dielectric material. The substantially planar sheet of dielectric material is configured to guide the guided light 104 using total internal reflection. According to various examples, the optically transparent material of the light guide 122 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 122 may further include a cladding layer (not illustrated) on at least a portion of a surface (e.g., one or both of the top surface and the bottom surface) of the light guide 122. The cladding layer may be used to further facilitate total internal reflection, according to some examples.

Further, according to some embodiments, the light guide 122 is configured to guide the guided light 104 according to total internal reflection at a non-zero propagation angle between the first surface 122' (e.g., 'front' surface or side) and the second surface 122" (e.g., 'back' surface or side) of the light guide 122. In particular, the guided light 104 propagates by reflecting or 'bouncing' between the first surface 122' and the second surface 122" of the light guide 122 at the non-zero propagation angle. In some embodiments, the guided light 104 may comprise a plurality of guided light beams of different colors of light that are guided by the light guide 122 at respective ones of different color-specific, non-zero propagation angles. Note that the non-zero propagation angle is not illustrated in FIGS. 3A-3C for simplicity of illustration. However, the bold arrow in various figures depicting a propagation direction 103 illustrates a general propagation direction of the guided light 104 along the light guide length.

As defined herein, a 'non-zero propagation angle' is an angle relative to a surface (e.g., the first surface 122' or the second surface 122") of the light guide 122. Further, the non-zero propagation angle is both greater than zero and less than a critical angle of total internal reflection within the light guide 122, according to various embodiments. Moreover, a specific non-zero propagation angle may be chosen (e.g., arbitrarily) for a particular implementation as long as the specific non-zero propagation angle is less than the critical angle of total internal reflection within the light guide 122. In various embodiments, the guided light 104 may be introduced or coupled into the light guide 122 at the non-zero propagation angle.

According to various embodiments, the guided light 104 or equivalently the guided 'light beam' produced by coupling light into the light guide 122 may be a collimated light beam. Herein, a 'collimated light' or 'collimated light beam' is generally defined as a beam of light in which rays of the light beam are substantially parallel to one another within the light beam (e.g., the guided light 104). Further, rays of light that diverge or are scattered from the collimated light beam are not considered to be part of the collimated light beam, by definition herein. In some embodiments, second planar backlight 120 of the mode-switchable backlight 100 may include a collimator such as, but not limited to, a lens, a reflector or mirror, or diffraction grating configured to collimate the light introduced into the light guide 122. In some embodiments, a source of light (e.g., a light source) may comprise a collimator. The guided light 104 may be collimated according to or having a collimation factor σ, in various embodiments.

As mentioned above and according to various embodiments, second planar backlight 120 comprises an array of multibeam elements 124. According to various embodiments (e.g., as illustrated in FIGS. 3A-3C), multibeam elements 124 of the multibeam element array may be located at the first surface 122' of the light guide 122 (e.g., adjacent to the first surface of the second planar backlight 120). In other examples (not illustrated), the multibeam elements 124 may be located within the light guide 122. In yet other embodiments (not illustrated), the multibeam elements 124 may be located at or on the second surface 122" of the light guide 122 (e.g., adjacent to the second surface of the second planar backlight 120). Further, a size of the multibeam element 124 is comparable to a size of a light valve of a multiview display configured to display the multiview image. That is, the multibeam element size is comparable to a light valve size of a light valve array in a multiview display that includes the mode-switchable backlight 100 and second planar backlight 120 thereof, for example.

FIGS. 3A-3C also illustrate an array of light valves 106 (e.g., of the multiview display), by way of example and not limitation. In various embodiments, any of a variety of different types of light valves may be employed as the light valves 106 of the light valve array including, but not limited to, one or more of liquid crystal light valves, electrophoretic light valves, and light valves based on or employing electrowetting. Further, as illustrated, there may be one unique set of light valves 106 for each multibeam element 124 of the array of multibeam elements. The unique set of light valves 106 may correspond to a multiview pixel 106' of the multiview display, for example.

Herein, the 'size' may be defined in any of a variety of manners to include, but not be limited to, a length, a width or an area. For example, the size of a light valve may be a length thereof and the comparable size of the multibeam element 124 may also be a length of the multibeam element 124. In another example, size may refer to an area such that an area of the multibeam element 124 may be comparable to an area of the light valve.

In some embodiments, the size of the multibeam element 124 is comparable to the light valve size such that the multibeam element size is between about fifty percent (50%) and about two hundred percent (200%) of the light valve size. For example, if the multibeam element size is denoted 's' and the light valve size is denoted 'S' (e.g., as illustrated in FIG. 3A), then the multibeam element size s may be given by equation (2) as $$\tfrac{1}{2}S \leq s \leq 2S \quad (2)$$

In other examples, the multibeam element size is greater than about sixty percent (60%) of the light valve size, or about seventy percent (70%) of the light valve size, or greater than about eighty percent (80%) of the light valve size, or greater than about ninety percent (90%) of the light valve size, and the multibeam element is less than about one hundred eighty percent (180%) of the light valve size, or less than about one hundred sixty percent (160%) of the light valve size, or less than about one hundred forty percent (140%) of the light valve size, or less than about one hundred twenty percent (120%) of the light valve size. For example, by 'comparable size', the multibeam element size may be between about seventy-five percent (75%) and about one hundred fifty (150%) of the light valve size. In another example, the multibeam element 124 may be comparable in size to the light valve where the multibeam element size is between about one hundred twenty-five percent (125%) and about eighty-five percent (85%) of the light valve size. According to some embodiments, the comparable sizes of the multibeam element 124 and the light valve may be chosen to reduce, or in some examples to minimize, dark zones between views of the multiview display, while at the same time reducing, or in some examples minimizing, an overlap between views of the multiview display or equivalent of the multiview image.

Note that, as illustrated in FIG. 3B, the size (e.g. width) of a multibeam element 124 may correspond to a size (e.g., width) of a light valve 106 in the light valve array. In other examples, the multibeam element size may be defined as a distance (e.g., a center-to-center distance) between adjacent light valves 106 of the light valve array. For example, the light valves 106 may be smaller than the center-to-center distance between the light valves 106 in the light valve array. As such, the multibeam element size may be defined as either the size of the light valve 106 itself or a size corresponding to the center-to-center distance between the light valves 106, for example.

In some embodiments, a relationship between the multibeam elements 124 of the plurality and corresponding multiview pixels 106' (e.g., sets of light valves 106) may be a one-to-one relationship. That is, there may be an equal number of multiview pixels 106' and multibeam elements 124. FIG. 3C explicitly illustrates by way of example the one-to-one relationship where each multiview pixel 106' comprising a different set of light valves 106 is illustrated as surrounded by a dashed line. In other embodiments (not illustrated), the number of multiview pixels 106' and multibeam elements 124 may differ from one another.

In some embodiments, an inter-element distance (e.g., center-to-center distance) between a pair of adjacent multibeam elements 124 of the plurality may be equal to an inter-pixel distance (e.g., a center-to-center distance) between a corresponding adjacent pair of multiview pixels 106', e.g., represented by light valve sets. In other embodiments (not illustrated), the relative center-to-center distances of pairs of multibeam elements 124 and corresponding light valve sets may differ, e.g., the multibeam elements 124 may have an inter-element spacing (i.e., center-to-center distance) that is one of greater than or less than a spacing (i.e., center-to-center distance) between light valve sets representing multiview pixels 106'.

In some embodiments, a shape of the multibeam element 124 is analogous to a shape of the multiview pixel 106' or equivalently, a shape of a set (or 'sub-array') of the light valves 106 corresponding to the multiview pixel 106'. For example, the multibeam element 124 may have a square shape and the multiview pixel 106' (or an arrangement of a corresponding set of light valves 106) may be substantially square. In another example, the multibeam element 124 may have a rectangular shape, i.e., may have a length or longitudinal dimension that is greater than a width or transverse dimension. In this example, the multiview pixel 106' (or equivalently the arrangement of the set of light valves 106) corresponding to the multibeam element 124 may have an analogous rectangular shape. FIG. 3C illustrates a perspective view of square-shaped multibeam elements 124 and corresponding square-shaped multiview pixels 106' comprising square sets of light valves 106. In yet other examples (not illustrated), the multibeam elements 124 and the corresponding multiview pixels 106' have various shapes including or at least approximated by, but not limited to, a triangular shape, a hexagonal shape, and a circular shape.

Further (e.g., as illustrated in FIG. 3B), each multibeam element 124 may be configured to provide directional emitted light 102" to one and only one multiview pixel 106', according to some embodiments. In particular, for a given one of the multibeam elements 124, the directional emitted light 102" having different principal angular directions corresponding to the different views of the multiview display are substantially confined to a single corresponding multiview pixel 106' and the light valves 106 thereof, i.e., a single set of light valves 106 corresponding to the multibeam element 124, as illustrated in FIG. 3B. As such, each multibeam element 124 of the first planar backlight 110 provides a corresponding plurality of directional light beams of the directional emitted light 102" that has a set of the different principal angular directions corresponding to the different views of the multiview image (i.e., the set of directional light beams contains a light beam having a direction corresponding to each of the different view directions).

According to various embodiments, the multibeam elements 124 of the second planar backlight 120 may comprise any of a number of different structures configured to scatter out a portion of the guided light 104. For example, the different structures may include, but are not limited to, diffraction gratings, micro-reflective elements, micro-refractive elements, or various combinations thereof. In some embodiments, the multibeam element 124 comprising a diffraction grating is configured to diffractively couple or scatter out the guided light portion as the directional emitted light 102" comprising a plurality of directional light beams having the different principal angular directions. In other embodiments, the multibeam element 124 comprising a micro-reflective element is configured to reflectively couple or scatter out the guided light portion as the plurality of directional light beams, or the multibeam element 124 comprising a micro-refractive element is configured to couple or scatter out the guided light portion as the plurality of directional light beams by or using refraction (i.e., refractively scatter out the guided light portion).

Figure 5A:
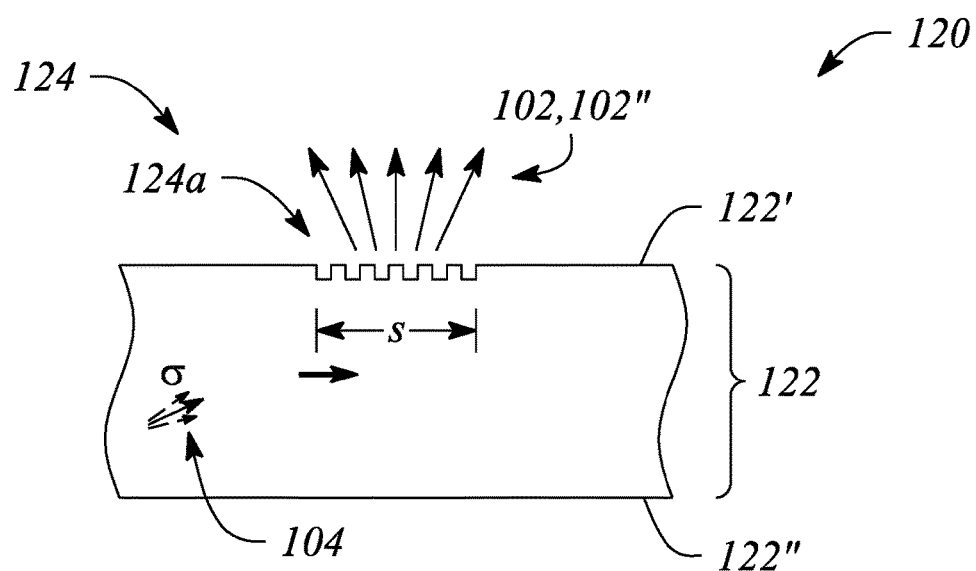
FIG. 5A illustrates a cross-sectional view of a portion of a second planar backlight including a multibeam element in an example, according to an embodiment consistent with the principles described herein.
Figure 5B:
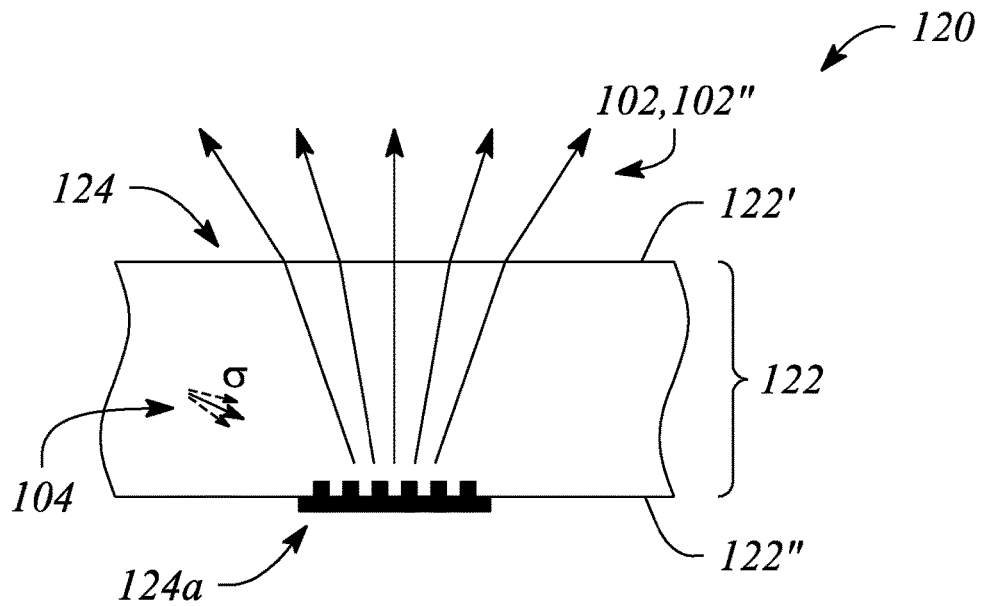
FIG. 5B illustrates a cross-sectional view of a portion of a second planar backlight including a multibeam element in an example, according to another embodiment consistent with the principles described herein.

FIG. 5A illustrates a cross-sectional view of a portion of a second planar backlight 120 including a multibeam element 124 in an example, according to an embodiment consistent with the principles described herein. FIG. 5B illustrates a cross-sectional view of a portion of a second planar backlight 120 including a multibeam element 124 in an example, according to another embodiment consistent with the principles described herein. In particular, FIGS. 5A-5B illustrate the multibeam element 124 of the second planar backlight 120 comprising a diffraction grating 124a. The diffraction grating 124a is configured to diffractively couple or scatter out a portion of the guided light 104 as the plurality of directional light beams of the directional emitted light 102". The diffraction grating 124a comprises a plurality of diffractive features spaced apart from one another by a diffractive feature spacing (or a diffractive feature pitch or grating pitch) configured to provide diffractive scattering out of the guided light portion. According to various embodiments, the spacing or grating pitch of the diffractive features in the diffraction grating 124a may be sub-wavelength (i.e., less than a wavelength of the guided light 104).

In some embodiments, the diffraction grating 124a of the multibeam element 124 may be located at or adjacent to a surface of the light guide 122. For example, the diffraction grating 124a may be at or adjacent to the first surface 122' of the light guide 122, as illustrated in FIG. 5A. The diffraction grating 124a at the first surface 122' of the light guide 122 may be a transmission mode diffraction grating configured to diffractively scatter out the guided light portion through the first surface 122' as the directional light beams of the directional emitted light 102". In another example, as illustrated in FIG. 5B, the diffraction grating 124a may be located at or adjacent to the second surface 122" of the light guide 122. When located at the second surface 122", the diffraction grating 124a may be a reflection mode diffraction grating. As a reflection mode diffraction grating, the diffraction grating 124a is configured to both diffract the guided light portion and reflect the diffracted guided light portion toward the first surface 122' to exit through the first surface 122' as the directional light beams of the directional emitted light 102". In other embodiments (not illustrated), the diffraction grating may be located between the surfaces of the light guide 122, e.g., as one or both of a transmission mode diffraction grating and a reflection mode diffraction grating. Note that, in some embodiments described herein, the principal angular directions of the directional light beams of the directional emitted light 102" may include an effect of refraction due to the directional light beams exiting the light guide 122 at a light guide surface. For example, FIG. 5B illustrates refraction (i.e., bending) of the directional light beams due to a change in refractive index as the directional emitted light 102" crosses the first surface 122'. Also see FIGS. 8A and 8B, described below.

According to some embodiments, the diffractive features of the diffraction grating 124a may comprise one or both of grooves and ridges that are spaced apart from one another. The grooves or the ridges may comprise a material of the light guide 122, e.g., may be formed in a surface of the light guide 122. In another example, the grooves or the ridges may be formed from a material other than the light guide material, e.g., a film or a layer of another material on a surface of the light guide 122.

In some embodiments, the diffraction grating 124a of the multibeam element 124 is a uniform diffraction grating in which the diffractive feature spacing is substantially constant or unvarying throughout the diffraction grating 124a. In other embodiments, the diffraction grating 124a may be a chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a 'chirp' of or change in the diffractive feature spacing that varies linearly with distance. As such, the chirped diffraction grating is a 'linearly chirped' diffraction grating, by definition. In other embodiments, the chirped diffraction grating of the multibeam element 124 may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

Figure 6:
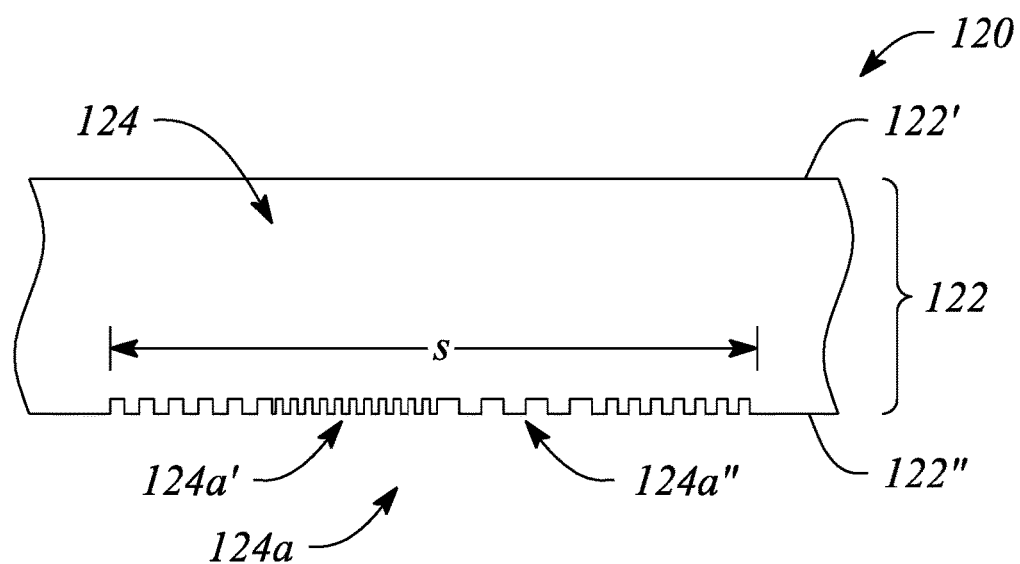
FIG. 6 illustrates a cross-sectional view of a diffraction grating comprising a plurality of sub-gratings in an example, according to an embodiment consistent with the principles described herein.

In some embodiments, the diffraction grating 124a may comprise a plurality of diffraction gratings or equivalently a plurality of sub-gratings. FIG. 6 illustrates a cross-sectional view of a diffraction grating 124a comprising a plurality of sub-gratings in an example, according to an embodiment consistent with the principles described herein. As illustrated in FIG. 6, the plurality of sub-gratings comprises a first sub-grating 124a' and a second sub-grating 124a" within the diffraction grating 124a of the multibeam element 124 on a surface (e.g., a second surface 122", as illustrated) of the light guide 122. A size s of the multibeam element 124 is illustrated in FIG. 6.

According to some embodiments, a differential density of sub-gratings within the diffraction grating 124a between different multibeam elements 124 of the multibeam element plurality may be configured to control a relative intensity of the plurality of directional light beams of the directional emitted light 102" that is diffractively scattered out by respective different multibeam elements 124. In other words, the multibeam elements 124 may have different densities of sub-gratings within the diffraction gratings 124a, respectively, and the different sub-grating densities may be configured to control the relative intensity of the plurality of directional light beams. In particular, a multibeam element 124 having fewer sub-gratings within the diffraction grating 124a may produce a plurality of directional light beams of the directional emitted light 102" having a lower intensity (or beam density) than another multibeam element 124 having relatively more sub-gratings.

Figure 7:
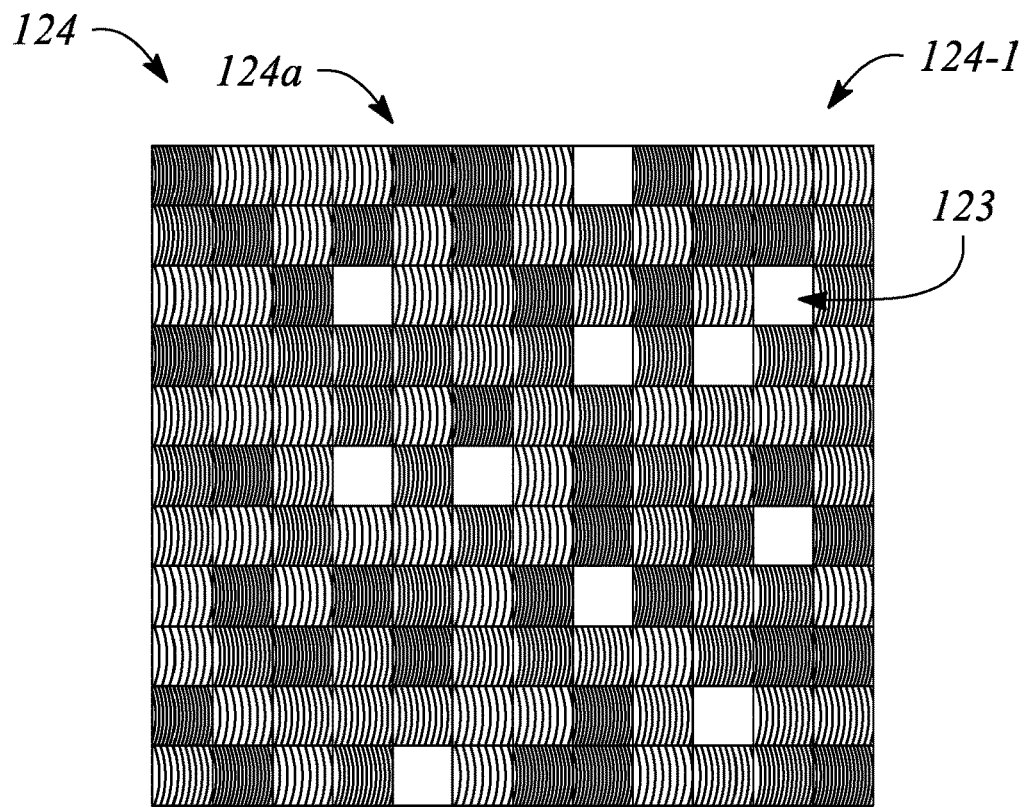
FIG. 7 illustrates a plan view of a pair of multibeam elements in an example, according to an embodiment consistent with the principles described herein.
Figure 7:
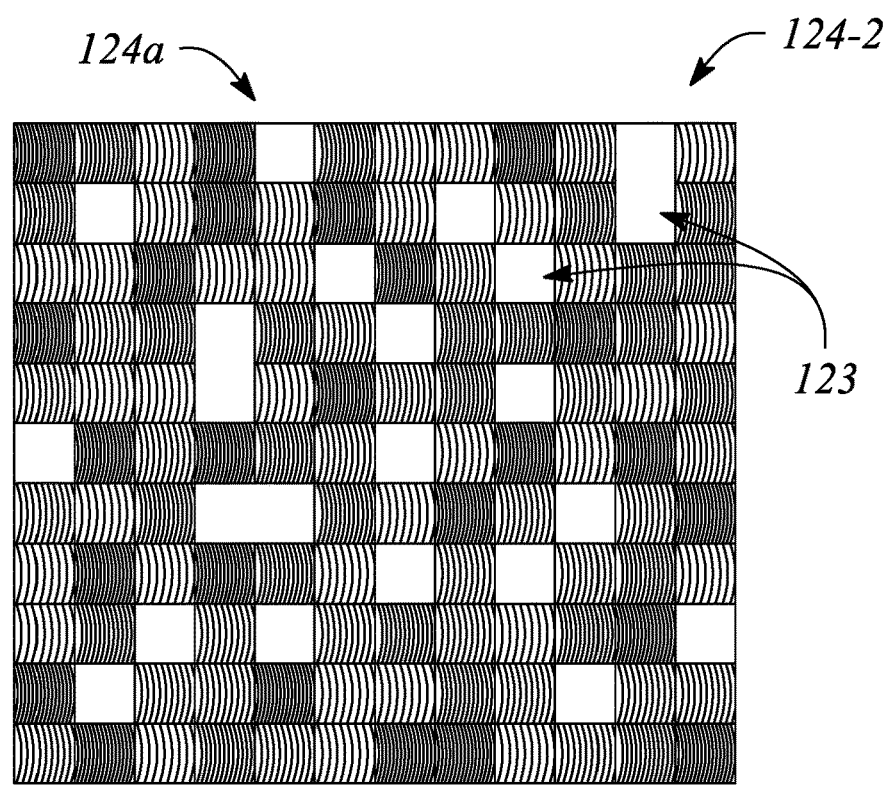

FIG. 7 illustrates a plan view of a pair of multibeam elements 124 in an example, according to an embodiment consistent with the principles described herein. As illustrated, a first multibeam element 124-1 of the pair has a higher density of sub-gratings within the diffraction grating 124a than are present in a second multibeam element 124-2 of the pair. In particular, the second multibeam element 124-2 has a diffraction grating 124a with fewer sub-gratings and more locations 123 without a sub-grating than the first multibeam element 124-1. In some embodiments, the higher density of sub-gratings in the first multibeam element 124-1 may provide a plurality of directional light beams having a higher intensity than the intensity of the plurality of directional light beams provided by the second multibeam element 124-2. The higher and lower intensities of the respective directional light beam pluralities provided by the differential sub-grating densities illustrated in FIG. 7 may be used to compensate for a change in optical intensity of the guided light within the light guide as a function of propagation distance, according to some embodiments. By way of example and not limitation, FIG. 7 also illustrates diffraction gratings 124a with sub-gratings having curved diffractive features.

Figure 8A:
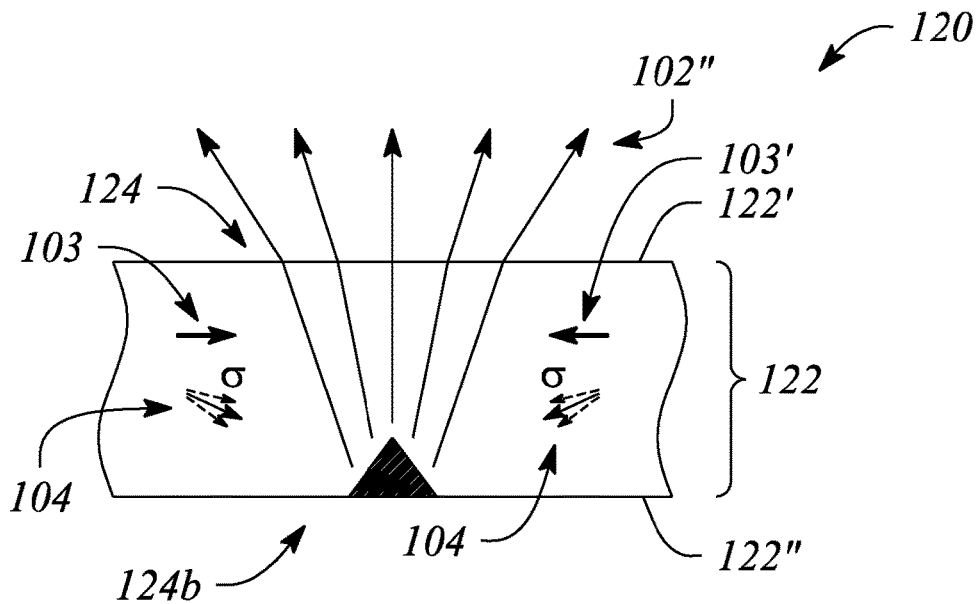
FIG. 8A illustrates a cross-sectional view of a portion of a second planar backlight including a multibeam element in an example, according to another embodiment consistent with the principles described herein.
Figure 8B:
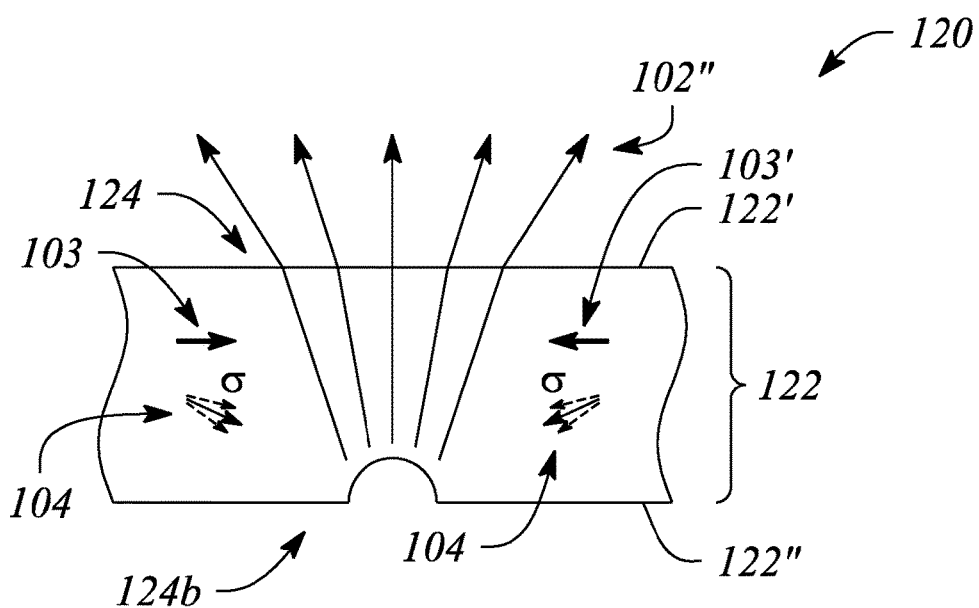
FIG. 8B illustrates a cross-sectional view of a portion of a second planar backlight including a multibeam element in an example, according to another embodiment consistent with the principles described herein.

FIG. 8A illustrates a cross-sectional view of a portion of a second planar backlight 120 including a multibeam element 124 in an example, according to another embodiment consistent with the principles described herein. FIG. 8B illustrates a cross-sectional view of a portion of a second planar backlight 120 including a multibeam element 124 in an example, according to another embodiment consistent with the principles described herein. In particular, FIGS. 8A and 8B illustrate various embodiments of the multibeam element 124 comprising a micro-reflective element. Micro-reflective elements used as or in the multibeam element 124 may include, but are not limited to, a reflector that employs a reflective material or layer thereof (e.g., a reflective metal) or a reflector based on total internal reflection (TIR). According to some embodiments (e.g., as illustrated in FIGS. 8A-8B), the multibeam element 124 comprising the micro-reflective element may be located at or adjacent to a surface (e.g., the second surface 122") of the light guide 122. In other embodiments (not illustrated), the micro-reflective element may be located within the light guide 122 between the first and second surfaces 122', 122".

For example, FIG. 8A illustrates the multibeam element 124 comprising a micro-reflective element 124b having reflective facets (e.g., a 'prismatic' micro-reflective element) located adjacent to the second surface 122" of the light guide 122. The facets of the illustrated prismatic micro-reflective element 124b are configured to reflect (i.e., reflectively scatter) the portion of the guided light 104 out of the light guide 122 as directional light beams of the directional emitted light 102". The facets may be slanted or tilted (i.e., have a tilt angle) relative to a propagation direction of the guided light 104 to reflect the guided light portion out of light guide 122 as the directional emitted light 102", for example. The facets may be formed using a reflective material within the light guide 122 (e.g., as illustrated in FIG. 8A) or may be surfaces of a prismatic cavity in the second surface 122", according to various embodiments. When a prismatic cavity is employed, either a refractive index change at the cavity surfaces may provide reflection (e.g., TIR reflection) or the cavity surfaces that form the facets may be coated by a reflective material to provide reflection, in some embodiments.

In another embodiment, FIG. 8B illustrates the multibeam element 124 comprising a micro-reflective element 124b having a substantially smooth, curved surface such as, but not limited to, a semi-spherical micro-reflective element 124b. A specific surface curve of the micro-reflective element 124b may be configured to reflect the guided light portion in different directions depending on a point of incidence on the curved surface with which the guided light 104 makes contact, for example. As illustrated in FIGS. 8A and 8B, the guided light portion that is reflectively scattered out of the light guide 122 exits or is emitted from the first surface 122', by way of example and not limitation. As with the prismatic micro-reflective element 124b in FIG. 8A, the micro-reflective element 124b in FIG. 8B may be either a reflective material within the light guide 122 or a cavity (e.g., a semi-circular cavity) formed in the second surface 122", as illustrated in FIG. 8B by way of example and not limitation. FIGS. 8A and 8B also illustrate the guided light 104 having two propagation directions 103, 103' (i.e., illustrated as bold arrows), by way of example and not limitation. Using two propagation directions 103, 103' may facilitate providing the plurality of directional light beams of the directional emitted light 102" with symmetrical principal angular directions, for example.

Figure 9:
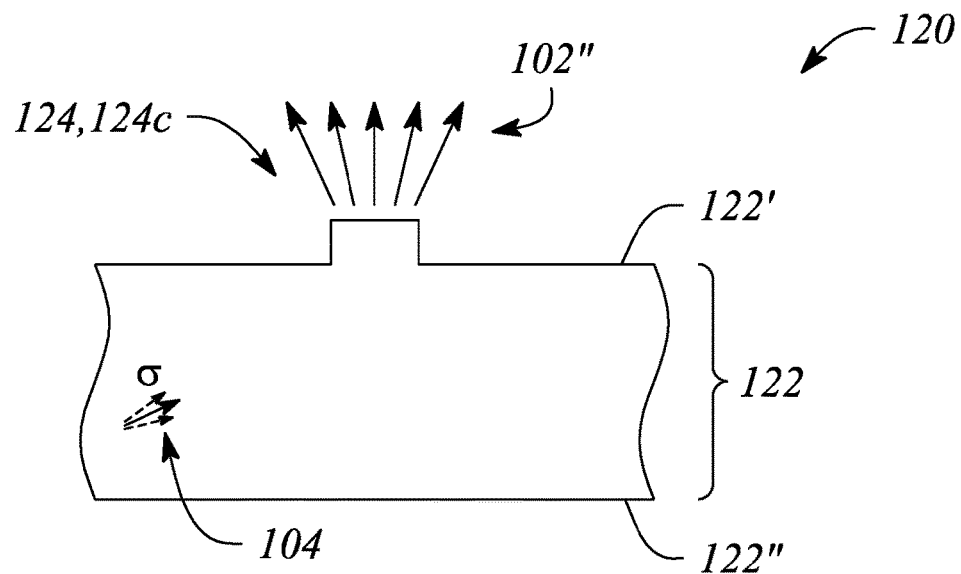
FIG. 9 illustrates a cross-sectional view of a portion of a second planar backlight including a multibeam element in an example, according to another embodiment consistent with the principles described herein.

FIG. 9 illustrates a cross-sectional view of a portion of a second planar backlight 120 including a multibeam element 124 in an example, according to another embodiment consistent with the principles described herein. In particular, FIG. 9 illustrates a multibeam element 124 comprising a micro-refractive element 124c. According to various embodiments, the micro-refractive element 124c is configured to refractively couple or scatter out a portion of the guided light 104 from the light guide 122. That is, the micro-refractive element 124c is configured to employ refraction (e.g., as opposed to diffraction or reflection) to couple or scatter out the guided light portion from the light guide 122 as the directional emitted light 102" comprising the directional light beams, as illustrated in FIG. 9. The micro-refractive element 124c may have various shapes including, but not limited to, a semi-spherical shape, a rectangular shape or a prismatic or and inverted prismatic shape (i.e., a shape having sloped facets). According to various embodiments, the micro-refractive element 124c may extend or protrude out of a surface (e.g., the first surface 122') of the light guide 122, as illustrated, or may be a cavity in the surface (not illustrated). Further, the micro-refractive element 124c may comprise a material of the light guide 122, in some embodiments. In other embodiments, the micro-refractive element 124c may comprise another material adjacent to, and in some examples, in contact with the light guide surface.

Referring again to FIGS. 3A-3C, the second planar backlight 120 may further comprise a light source 126. According to various embodiments, the light source 126 is configured to provide the light to be guided within light guide 122. In particular, the light source 126 may be located adjacent to an entrance surface or end (input end) of the light guide 122. In various embodiments, the light source 126 may comprise substantially any source of light (e.g., optical emitter) including, but not limited to, one or more light emitting diodes (LEDs) or a laser (e.g., laser diode). In some embodiments, the light source 126 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 126 may be a substantially broadband light source configured to provide substantially broadband or polychromatic light. For example, the light source 126 may provide white light. In some embodiments, the light source 126 may comprise a plurality of different optical emitters configured to provide different colors of light. The different optical emitters may be configured to provide light having different, color-specific, non-zero propagation angles of the guided light corresponding to each of the different colors of light.

In some embodiments, the light source 126 may further comprise a collimator (not illustrated). The collimator may be configured to receive substantially uncollimated light from one or more of the optical emitters of the light source 126. The collimator is further configured to convert the substantially uncollimated light into collimated light. In particular, the collimator may provide collimated light having the non-zero propagation angle and being collimated according to a predetermined collimation factor $\sigma$, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate the collimated light to the light guide 122 to propagate as the guided light 104, described above.

According to some embodiments, the mode-switchable backlight 100 further comprises a light-blocking layer 130 between the first planar backlight 110 and the second planar backlight 120. The light-blocking layer 130 is configured to selectively block light emitted from the second surface (e.g., back surface) of the second planar backlight 120 from entering the first planar backlight 110, according to some embodiments. In particular, the light-blocking layer 130 is configured to block light emitted from the second planar backlight 120 generally toward the first planar backlight 110, i.e., in a 'first direction'. On the other hand, the light-blocking layer 130 is further configured to transmit light emitted from the first planar backlight 110 generally toward the second surface of the second planar backlight 120, i.e., in a 'second direction' opposite to the first direction, in at least some operational modes and according to at least some embodiments of the mode-switchable backlight 100. As such, the light-blocking layer 130 may represent a unidirectional light-blocking layer 130, according to some embodiments. In other embodiments, the light-blocking layer 130 may be configured to selectively block light from passing through the light-blocking layer 130 and reaching the second planar backlight 120, e.g., from the first planar backlight 110. In these embodiments, the light-blocking layer 130 may block the light only during specific modes of the mode-switchable backlight 100, for example. The light-blocking layer 130 being configured to block light is illustrated using cross-hatching in FIG. 3B, while absence of the cross-hatching in FIG. 3A illustrates the light-blocking layer 130 being configured to transmit light (e.g., emitted light 102 from the first planar backlight 110).

Figure 10A:
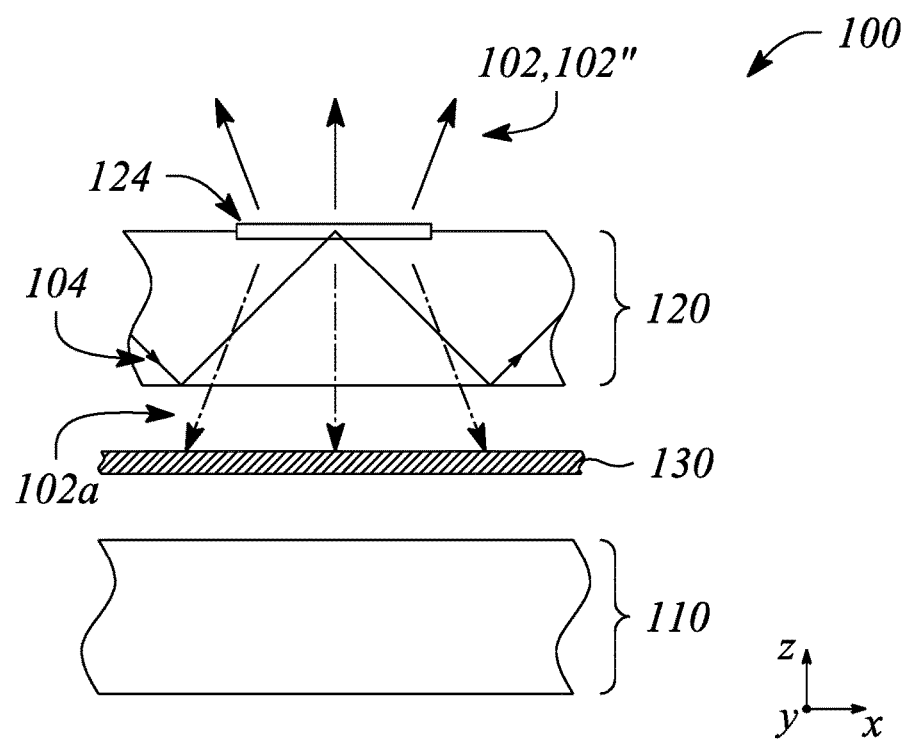
FIG. 10A illustrates a cross-sectional view of a portion a mode-switchable backlight in an example, according to an embodiment consistent with the principles described herein.
Figure 10B:
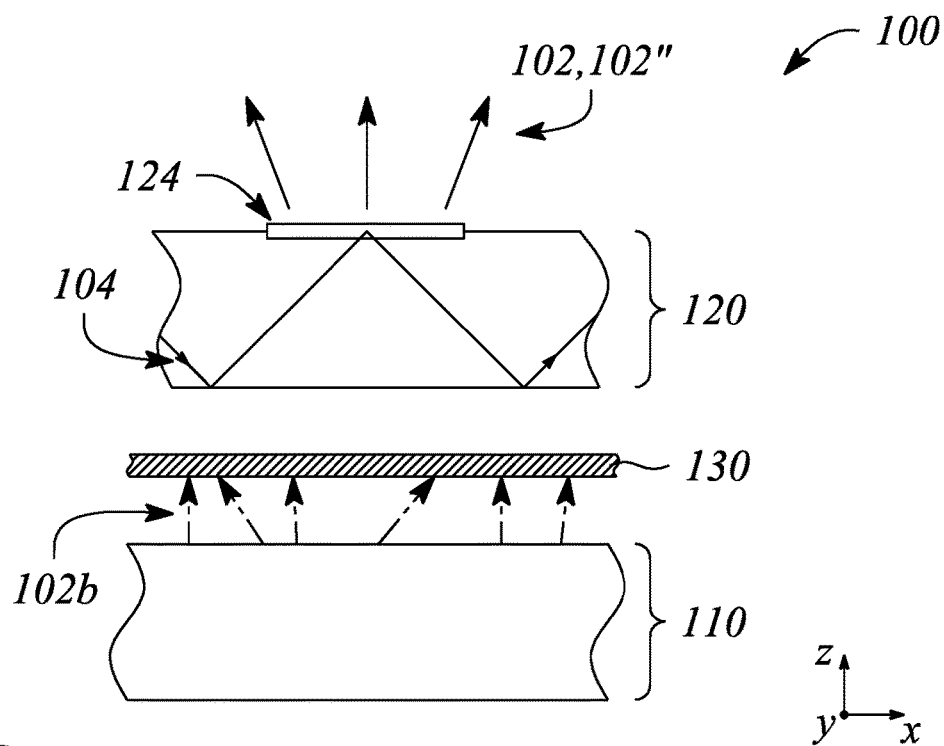
FIG. 10B illustrates a cross-sectional view of a portion of a mode-switchable backlight in another example, according to an embodiment consistent with the principles described herein.

FIG. 10A illustrates a cross-sectional view of a portion a mode-switchable backlight 100 in an example, according to an embodiment consistent with the principles described herein. FIG. 10B illustrates a cross-sectional view of a portion of a mode-switchable backlight 100 in another example, according to an embodiment consistent with the principles described herein. The illustrated portion in FIGS. 10A and 10B may be a portion of the mode-switchable backlight 100 operating in the second mode as illustrated in FIG. 3B, for example. In particular, the mode-switchable backlight 100 illustrated in FIGS. 10A-10B includes the first planar backlight 110, the second planar backlight 120 and the light-blocking layer 130 between the first and second planar backlights 110, 120. As illustrated in FIGS. 10A-10B, the light-blocking layer 130 is configured to block light.

In some embodiments, e.g., as illustrated in FIG. 10A, the light-blocking layer 130 may be configured to block light originating in the second planar backlight 120 and propagating generally in a negative z-direction. For example, a result of diffraction of the guided light 104 by the multibeam element 124 may be both the scattered-out light as the directional emitted light 102" (e.g., generally directed in a positive z-direction) and a secondary light beam 102a that is scattered or generally directed in the negative z-direction. The light-blocking layer 130 may be configured to block the secondary light beam(s) 102a, as illustrated in FIG. 10A.

Alternatively or in addition (e.g., as illustrated in FIG. 10B), the light-blocking layer 130 may be configured to block light 102b propagating in the positive z-direction from the first planar backlight 110 towards the second planar backlight 120 during the second mode. In particular, the light-blocking layer 130 may be configured to block light 102b propagating in the positive z-direction in the second mode in which the second planar backlight 120 is active or otherwise configured to provide the directional emitted light 102" (i.e., as illustrated). For example, the positive z-directed light 102b blocked by the light-blocking layer 130 may represent light originating in or produced by the first planar backlight 110. In another example, the positive z-directed light 102b may represent light from the second planar backlight 120 that is backscattered or reflected by the first planar backlight 110 toward the second planar backlight 120.

According to some embodiments, the light-blocking layer 130 may provide either passive light blocking or an active (e.g., switched) light blocking of the light propagating in the first direction. For example, the light-blocking layer 130 may be a substantially passive layer that blocks light propagating in the first direction while simultaneously transmits light propagating in the second direction. As such, the light-blocking layer 130 may remain substantially unchanged in both the first mode and the second mode of operation of the mode-switchable backlight 100. Examples of a passive layer that may be employed as the light-blocking layer 130 include, but are not limited to, a so-called unidirectional perfect absorber, a polarizer or polarization layer, and an angular filter. Other examples of a passive layers may include a multi-band filter (e.g., multi-band color filter) configured to selectively block (e.g., reflect, absorb, etc.) particular wavelengths of light produced by the second planar backlight 120 while allowing different wavelengths of light produced by the first planar backlight 110 to pass, for example.

In another example, the light-blocking layer 130 may be an active layer configured to block light transmission in a light-blocking mode or condition and to transmit light in a light-transmitting mode or condition. The active light-blocking layer 130 may be selectively switched into the light-blocking condition when the second planar backlight 120 is active (e.g., in the second mode) to prevent light from being transmitted from the second planar backlight 120 toward and into the first planar backlight 110. Moreover, the active light-blocking layer 130 may be selectively switched into the light-transmitting condition when the first planar backlight 110 is active (e.g., in the first mode) to allow light to propagate out of and through the second planar backlight 120 as the emitted light 102. Examples of active light-blocking layers 130 include, but are not limited to, a light valve (e.g., liquid crystal light valve) or a similar switchable absorption layer. Other examples include various other so-called 'active' shutter configurations based on electromechanical structures (e.g., microelectromechanical or MEMS mirrors, etc.), electroabsorption (e.g., semiconductor-based), and various non-linear crystals and organic polymers. In some embodiments, the multibeam element 124 may comprise a unidirectional scattering structure. As such, the light-blocking layer 130 may be omitted, e.g., as illustrated by way of example and not limitation in FIG. 3C.

According to some embodiments of the principles described herein, a mode-switchable display is provided. The mode-switchable display is configured to emit modulated light corresponding to or representing pixels of a two-dimensional (2D) image in a first mode of the mode-switchable display. In a second mode, the mode-switchable display is configured to emit modulated directional emitted light corresponding to or representing pixels of different views (view pixels) of a multiview image. In some embodiments, the first mode may also be referred to as a 2D mode, while the second mode may also be referred to as a multiview mode, for example. In the first or 2D mode, the mode-switchable display may be configured to display 2D information (e.g., 2D images, text, etc.). On the other hand, in the second or multiview mode, the mode-switchable display is configured to display multiview information (e.g., multiview images). In particular, the mode-switchable display may represent an autostereoscopic or glasses-free 3D electronic display in the second mode. That is, different ones of the modulated, differently directed light beams of the directional emitted light may correspond to different 'views' associated with the multiview information or multiview image, according to various examples. The different views may provide a 'glasses free' (e.g., autostereoscopic, holographic, etc.) representation of information being displayed by the mode-switchable display in the second mode, for example.

Figure 11:
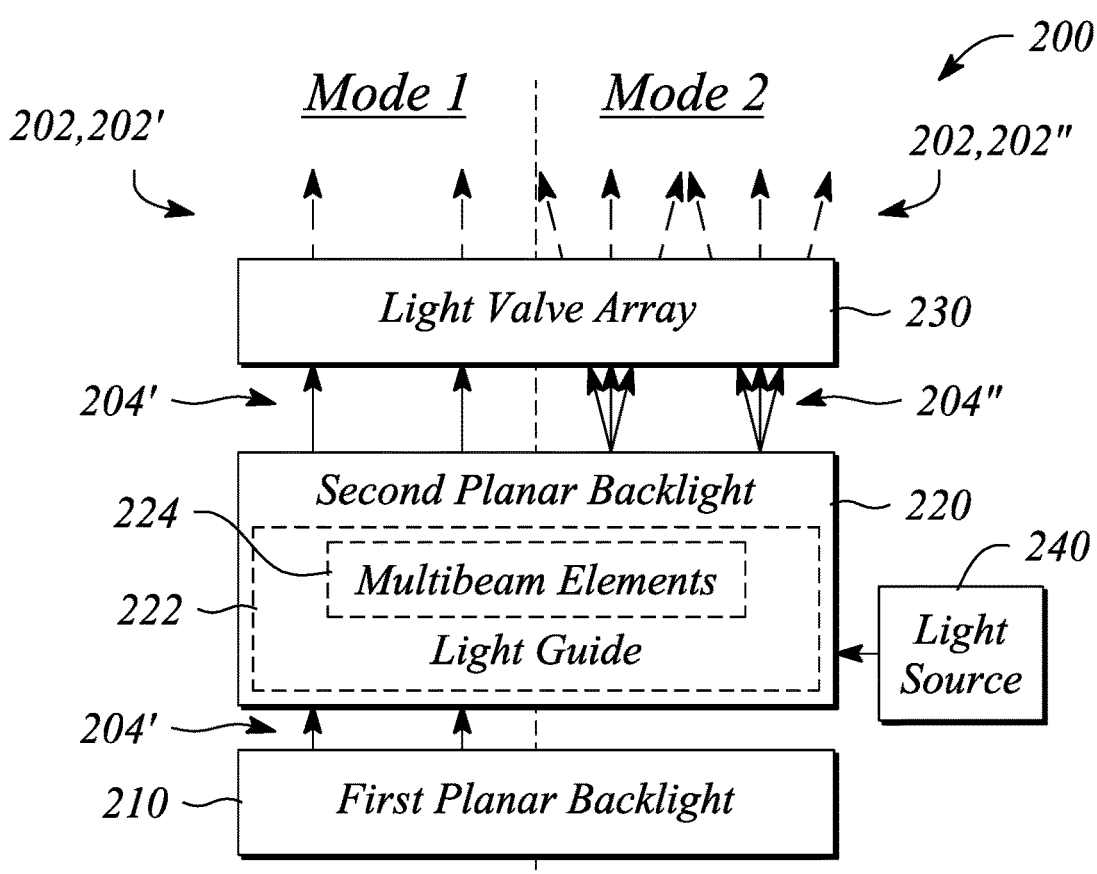
FIG. 11 illustrates a block diagram of a mode-switchable display in an example, according to an embodiment consistent with the principles described herein.

FIG. 11 illustrates a block diagram of a mode-switchable display 200 in an example, according to an embodiment consistent with the principles described herein. The mode-switchable display 200 may be used to present either 2D information or multiview information such as, but not limited to, 2D images, text, and multiview images. In particular, the mode-switchable display 200 illustrated in FIG. 11 is configured to emit modulated light 202 comprising broad-angle emitted light 202' during the first mode. The modulated broad-angle emitted light 202' may represent 2D pixels of a 2D displayed image, for example. Further, during the second mode (Mode 2) the mode-switchable display 200 illustrated in FIG. 11 is configured to emit modulated light 202 comprising modulated directional emitted light 202" including directional light beams with different principal angular directions representing pixels of a multiview image. In particular, the different principal angular directions may correspond to the different view directions of different views of the multiview image displayed by mode-switchable display 200 in the second mode. Dashed lines are used in FIG. 11 to emphasize modulation of the broad-angle emitted light 202' and the directional emitted light 202".

As illustrated in FIG. 11, the mode-switchable display 200 comprises a first planar backlight 210. The first planar backlight 210 is configured to provide broad-angle emitted light 204' during the first mode (Mode 1). In some embodiments, the first planar backlight 210 may be substantially similar to the first planar backlight 110 of the mode-switchable backlight 100, described above. For example, the first planar backlight may comprise a rectangular-shaped light guide having a light extraction layer configured to extract light from the rectangular-shaped light guide and to redirect the extracted light through the diffuser as the broad-angle emitted light 204'. In some embodiments, the first planar backlight 210 may comprise a diffuser adjacent to a planar light-emitting surface of the first planar backlight 210. The diffuser may be configured to scatter light emitted by the first planar backlight as the broad-angle emitted light 204'.

The mode-switchable display 200 illustrated in FIG. 11 further comprises a second planar backlight 220. The second planar backlight 220 comprising a light guide 222 and an array of multibeam elements 224 spaced apart from one another. The array of multibeam elements 224 is configured to scatter out guided light from the light guide 222 as directional emitted light 204" during the second mode. According to various embodiments, the directional emitted light 204" provided by an individual multibeam element 224 of the array of multibeam elements 224 comprises a plurality of directional light beams having different principal angular directions corresponding to view directions of the multiview image displayed by the mode-switchable display 200 in or during the second mode.

In some embodiments, the second planar backlight 220 may be substantially similar to the second planar backlight 120 of the above-described mode-switchable backlight 100. In particular, the light guide 222 and multibeam elements 224 may be substantially similar to the light guide 122 and multibeam elements 124, respectively. For example, the light guide 222 may be a plate light guide. Further, a multibeam element 224 of the array of multibeam elements 224 may comprises one or more of a diffraction grating, a micro-reflective element and a micro-refractive element optically connected to the light guide 222 to scatter out the guided light as the directional emitted light 204".

In some embodiments, the multibeam element 224 or equivalently the array of multibeam elements 224 may be located one of at a first surface and at a second surface of the light guide 222. Further, the second surface may be adjacent to a light-emitting surface of the first planar backlight 210, the multibeam element 224 being configured to scatter out the guided light as the plurality of directional light beams of the directional emitted light 204" through the first surface, in some embodiments.

As illustrated, the mode-switchable display 200 further comprises a light valve array 230. The light valve array 230 is configured to modulate the broad-angle emitted light 204' to provide a two-dimensional (2D) image during the first mode to modulate the directional emitted light 204" to provide a multiview image during the second mode. In particular, the light valve array 230 is configured to receive and modulate the broad-angle emitted light 204' to provide the broad-angle emitted light 202' during the first mode. Similarly, the light valve array 230 is configured to receive and modulate the directional emitted light 204" during the second mode to provide the modulated directional emitted light 202". In some embodiments, the light valve array 230 may be substantially similar to the array of light valves 106, described above with respect to the mode-switchable backlight 100. For example, a light valve of the light valve array may comprise a liquid crystal light valve. Further, a size of a multibeam element 224 of the array of multibeam elements 224 may be comparable to a size of a light valve of the light valve array 230, in some embodiments.

In various embodiments, the second planar backlight 220 may be located between the planar light-emitting surface of the first planar backlight 210 and the light valve array 230. In addition, the second planar backlight 220 may be transparent to the broad-angle emitted light 204' during the first mode.

In some embodiments (not illustrated), the mode-switchable display 200 further comprises a light-blocking layer between the first planar backlight 210 and the second planar backlight. The light-blocking layer may be substantially similar to the light-blocking layer 130 of the mode-switchable backlight 100, described above. In some embodiments (not illustrated), the mode-switchable display 200 comprises a switchable light-blocking layer between the first planar backlight 210 and the second planar backlight 220. The switchable light-blocking layer is configured to pass the broad-angle emitted light 204' from the first planar backlight in the first mode and to block light from the second planar backlight 220 in the second mode, according to various embodiments.

In some embodiments, the mode-switchable display 200 further comprises a light source 240 optically coupled to an input of the light guide of the second planar backlight. The light source 240 may be configured to provide the guided light one or both of having a non-zero propagation angle and being collimated according to a predetermined collimation factor. In some embodiments, the light source may substantially similar to the light source 126 described above with respect to the mode-switchable backlight 100. According to some embodiments, the light source 240 may be configured to produce different colors of light (i.e., is a color light source). Likewise, the light valve array 230 may comprise light valves comprising color subpixels (e.g., color filters representing red, green and blue). As such, the mode-switchable display 200 may be a color display configured to provide color images, in some embodiments.

Figure 12:
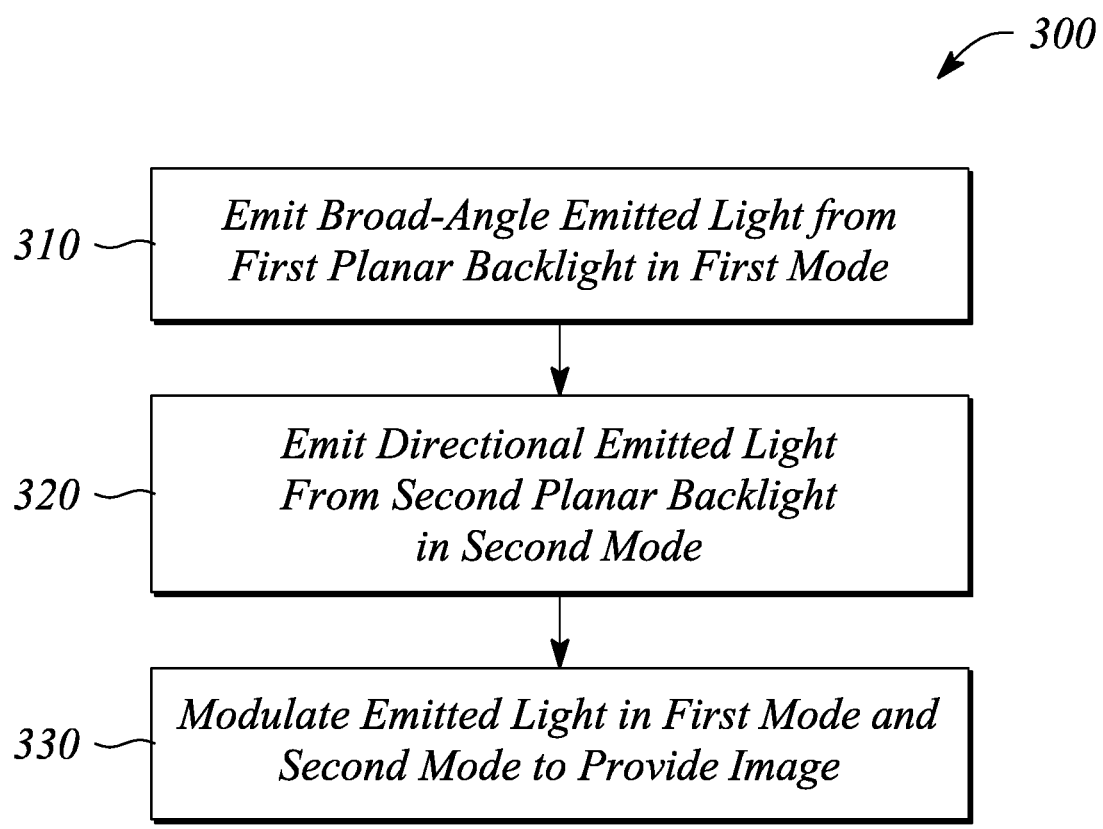
FIG. 12 illustrates a flow chart of a method of mode-switchable display operation in an example, according to an embodiment consistent with the principles described herein.

In accordance with other embodiments of the principles described herein, a method of mode-switchable display operation is provided. In particular, the method of mode-switchable display operation may have at least two modes, namely a first mode and a second mode. The first mode may display a two-dimensional (2D) image, while the second mode may display a three-dimensional (3D) or a multiview image, according to various embodiments. FIG. 12 illustrates a flow chart of a method 300 of mode-switchable display operation in an example, according to an embodiment consistent with the principles described herein.

As illustrated in FIG. 12, the method 300 of mode-switchable display operation comprises emitting 310 light from a light-emitting surface of a first planar backlight as broad-angle emitted light during the first mode. In some embodiments, the first planar backlight is substantially similar to the first planar backlight 110, described above with respect to the mode-switchable backlight 100. Further, the first mode and the emitted 310 light may be substantially similar to respective ones of the first mode (e.g., Mode 1) and the broad-angle emitted light 102' described above with respect to the mode-switchable backlight 100, according to some embodiments.

The method 300 of mode-switchable display operation illustrated in FIG. 12 further comprises emitting 320 light from a second planar backlight as directional emitted light during a second mode. According to various embodiments, the second planar backlight comprises a light guide and an array of multibeam elements configured to scatter out guided light from the light guide as the directional emitted light. In some embodiments, the second planar backlight may be substantially similar to the second planar backlight 120 of the above-described mode-switchable backlight 100. In particular, the light guide may be substantially similar to the light guide 122, the array of multibeam elements may be substantially similar to the array of multibeam elements 124, and the directional emitted light may be substantially similar to the directional emitted light 102". Similarly, the second mode may be substantially similar to the second mode of the mode-switchable backlight 100.

For example, the array of multibeam elements may comprise a plurality of individual multibeam elements spaced apart from one another along the light guide. Further, each individual multibeam element may comprise one or more of a diffraction grating, a micro-reflective element and a micro-refractive element optically connected to the light guide and configured to scatter out the directional emitted light. The directional emitted light may comprises a plurality of directional light beams having different principal angular directions corresponding to different view directions of the multiview image.

The method 300 of mode-switchable display operation further comprises modulating 330 the broad-angle emitted light to provide a two-dimensional image and the directional emitted light to provide a multiview image. In particular, modulating 330 uses a light valve array and a multibeam element of the array of multibeam elements has a size comparable to a size of a light valve of the light valve array, according to various embodiments. According to some embodiments, the light valve may be substantially similar to the light valve 106 of the array of light valves 106 or equivalently of the light valve array 230, as described above with respect to either the mode-switchable backlight 100 or the mode-switchable display 200.

In some embodiments (not illustrated), the method 300 of mode-switchable display operation further comprises transmitting the broad-angle emitted light through the second planar backlight during the first mode, the second planar backlight being transparent to the broad-angle emitted light. In some embodiments (not illustrated), the method 300 of mode-switchable display operation further comprises providing light to the light guide using a light source, the provided light being the guided light that one or both of has a non-zero propagation angle within the light guide and being collimated according to a collimation factor to provide a predetermined angular spread of the guided light. The light source may be substantially similar to the light source 126 of the mode-switchable backlight 100, in some embodiments. Further in some embodiments (not illustrated), the method 300 of mode-switchable display operation further comprises selectively blocking light from the second planar backlight emitted in a direction of the first planar backlight during the second mode using an active light-blocking layer. The active light-blocking layer may be substantially similar to the light-blocking layer 130 described above.

Thus, there have been described examples and embodiments of a mode-switchable backlight, a mode-switchable display and a method of mode-switchable display operation that provide a pair of modes. It should be understood that the above-described examples are merely illustrative of some of the many specific examples and embodiments that represent the principles described herein. Clearly, those skilled in the art can readily devise numerous other arrangements without departing from the scope as defined by the following claims.

What is claimed is:

1. A mode-switchable backlight comprising:
a first planar backlight having a light-emitting surface configured to provide broad-angle emitted light during a first mode; and
a second planar backlight comprising a light guide and an array of multibeam elements, a multibeam element of the array of multibeam elements comprising a diffraction grating that is configured to diffractively scatter out guided light from the light guide during a second mode as directional emitted light comprising a plurality of directional light beams having principal angular directions corresponding to view directions of a multiview image, the second planar backlight being adjacent to the light-emitting surface of the first planar backlight,
wherein the multibeam element has a size that is between fifty percent and two hundred percent of a light valve size of a light valve array and a shape analogous to a multiview pixel shape of a multiview display configured to display the multiview image.

2. The multiview display configured to display the multiview image comprising the mode-switchable backlight of claim 1, the multiview display further comprising an array of light valves including the light valve, the array of light valves being located adjacent to the second planar backlight and being configured to modulate the broad-angle emitted light to provide a two-dimensional (2D) image during the first mode and to modulate the plurality of directional light beams of the directional emitted light to provide the multiview image during the second mode.

3. The multiview display of claim 2, wherein the array of light valves comprises a plurality of liquid crystal light valves.

4. The mode-switchable backlight of claim 1, wherein the broad-angle emitted light provided by the first planar backlight is configured to be transmitted through the second planar backlight during the first mode.

5. The mode-switchable backlight of claim 1, wherein the diffraction grating comprises a plurality of sub-gratings.

6. The mode-switchable backlight of claim 1, wherein the multibeam element further comprises one or both of a micro-reflective element and a micro-refractive element, the micro-reflective element being configured to reflectively scatter out a portion of the guided light as the plurality of directional light beams of the directional emitted light and the micro-refractive element being configured to refractively scatter out a portion of the guided light as the plurality of directional light beams of the directional emitted light.

7. The mode-switchable backlight of claim 1, wherein the multibeam element is located one of at a first surface and at a second surface of the light guide, the second surface being adjacent to the light-emitting surface of the first planar backlight, and wherein the multibeam element is configured to scatter out the guided light as the plurality of directional light beams of the directional emitted light through the first surface.

8. The mode-switchable backlight of claim 1, further comprising a light source optically coupled to an input of the light guide, the light source being configured to provide the guided light one or both of having a non-zero propagation angle and being collimated according to a predetermined collimation factor.

9. The mode-switchable backlight of claim 1, further comprising a light-blocking layer between the first planar backlight and the second planar backlight, the light-blocking layer being configured to one or both of selectively block light emitted by the second planar backlight from reaching the first planar backlight and selectively block light from passing to the second planar backlight from the first planar backlight.

10. A mode-switchable display comprising:
a first planar backlight configured to provide broad-angle emitted light during a first mode;
a second planar backlight comprising a light guide and an array of multibeam elements spaced apart from one another and configured to scatter out guided light from the light guide as directional emitted light during a second mode, a multibeam element of the array of multibeam elements comprising a diffraction grating that is configured to diffractively scatter out guided light from the light guide; and
a light valve array configured to modulate the broad-angle emitted light to provide a two-dimensional image during the first mode and to modulate the directional emitted light to provide a multiview image during the second mode,
wherein a multibeam element of the array of multibeam elements has a size that is between fifty percent and two hundred percent of a size of a light valve of the light valve array and a shape analogous to a shape of a multiview pixel associated with the multibeam element.

11. The mode-switchable display of claim 10, wherein the first planar backlight comprises a diffuser adjacent to a planar light-emitting surface of the first planar backlight, the diffuser being configured to scatter light emitted by the first planar backlight as the broad-angle emitted light.

12. The mode-switchable display of claim 10, wherein the first planar backlight comprises a rectangular-shaped light guide having a light extraction layer configured to extract light from the rectangular-shaped light guide and to redirect the extracted light as the broad-angle emitted light.

13. The mode-switchable display of claim 10, wherein the directional emitted light provided by an individual multibeam element of the array of multibeam elements comprises a plurality of directional light beams having different principal angular directions corresponding to view directions of the multiview image.

14. The mode-switchable display of claim 10, wherein the second planar backlight is located between a planar light-emitting surface of the first planar backlight and the light valve array, the second planar backlight being transparent to the broad-angle emitted light during the first mode.

15. The mode-switchable display of claim 10, wherein the multibeam element of the array of multibeam elements further comprises one or both of a micro-reflective element and a micro-refractive element optically connected to the light guide to scatter out the guided light as the directional emitted light.

16. The mode-switchable display of claim 10, further comprising a light source optically coupled to an input of the light guide of the second planar backlight, the light source being configured to provide the guided light one or both of having a non-zero propagation angle and being collimated according to a predetermined collimation factor.

17. The mode-switchable display of claim 10, further comprising a switchable light-blocking layer between the first planar backlight and the second planar backlight, the switchable light-blocking layer being configured to pass the broad-angle emitted light from the first planar backlight in the first mode and to block light from the second planar backlight in the second mode.

18. A method of mode-switchable display operation, the method comprising:
emitting light from a light-emitting surface of a first planar backlight as broad-angle emitted light during a first mode;
emitting light from a second planar backlight as directional emitted light during a second mode, the second planar backlight comprising a light guide and an array of multibeam elements configured to scatter out guided light from the light guide as the directional emitted light, a multibeam element of the array of multibeam elements comprising a diffraction grating that is configured to diffractively scatter out guided light from the light guide; and
modulating the broad-angle emitted light to provide a two-dimensional image and the directional emitted light to provide a multiview image,
wherein modulating uses a light valve array, a multibeam element of the array of multibeam elements having a size that is between fifty percent and two hundred percent of a size of a light valve of the light valve array and a shape analogous to a shape of an associated multiview pixel.

19. The method of mode-switchable display operation of claim 18, the method further comprising transmitting the broad-angle emitted light through the second planar backlight during the first mode, the second planar backlight being transparent to the broad-angle emitted light.

20. The method of mode-switchable display operation of claim 18, wherein the array of multibeam elements comprises a plurality of individual multibeam elements spaced apart from one another along the light guide, each individual multibeam element comprising one or more of a diffraction grating, a micro-reflective element and a micro-refractive element optically connected to the light guide and configured to scatter out the directional emitted light comprising a plurality of directional light beams having different principal angular directions corresponding to different view directions of the multiview image.

21. The method of mode-switchable display operation of claim 18, further comprising providing light to the light guide using a light source, the provided light being the guided light that one or both of has a non-zero propagation angle within the light guide and being collimated according to a collimation factor to provide a predetermined angular spread of the guided light.

22. The method of mode-switchable display operation of claim 18, further comprising selectively blocking light from the second planar backlight emitted in a direction of the first planar backlight during the second mode using an active light-blocking layer.

* * * * *